(12) United States Patent
Keefer et al.

(10) Patent No.: US 8,015,808 B2
(45) Date of Patent: Sep. 13, 2011

(54) POWER PLANT WITH ENERGY RECOVERY FROM FUEL STORAGE

(75) Inventors: Bowie G. Keefer, Vancouver (CA); Surajit Roy, Burnaby (CA); Jean St.-Pierre, Vancouver (CA); Amy E. Nelson, Vancouver (CA); Shanna D. Knights, Burnaby (CA)

(73) Assignee: G4 Insights Inc., Burnaby, British Columbia (CA)

( * ) Notice: Subject to any disclaimer, the term of this patent is extended or adjusted under 35 U.S.C. 154(b) by 1277 days.

(21) Appl. No.: 11/506,562

(22) Filed: Aug. 17, 2006

(65) Prior Publication Data

US 2006/0280993 A1      Dec. 14, 2006

Related U.S. Application Data

(62) Division of application No. 10/043,727, filed on Jan. 8, 2002, now abandoned.

(60) Provisional application No. 60/260,608, filed on Jan. 9, 2001.

(51) Int. Cl.
 *F01B 29/10* (2006.01)
(52) U.S. Cl. .............. 60/517; 60/524; 60/646; 60/657
(58) Field of Classification Search ............ 60/517–526, 60/646, 657
See application file for complete search history.

(56) References Cited

U.S. PATENT DOCUMENTS

| | | | |
|---|---|---|---|
| 3,070,703 A * | 12/1962 | Podolny | ............................ 290/2 |
| 3,336,162 A | 8/1967 | Zachmann | |
| 3,748,180 A | 7/1973 | Clausi et al. | |
| 3,847,672 A | 11/1974 | Trocciola et al. | |
| 3,865,924 A | 2/1975 | Gidaspow et al. | |
| 3,975,913 A * | 8/1976 | Erickson | ......................... 60/645 |
| 4,135,361 A * | 1/1979 | Eisenhaure | ..................... 60/780 |
| 4,386,309 A | 5/1983 | Peschka | |
| 4,532,192 A | 7/1985 | Baker et al. | |
| 4,555,453 A | 11/1985 | Appleby | |

(Continued)

FOREIGN PATENT DOCUMENTS

CA      1256038      *   6/1989

(Continued)

OTHER PUBLICATIONS

Vaporciyan et al., "Periodic Separating Reactors: Experiments and Theory," *AIChE Journal* 35:831-844, 1989.

(Continued)

*Primary Examiner* — Hoang M Nguyen
(74) *Attorney, Agent, or Firm* — Klarquist Sparkman, LLP

(57) ABSTRACT

Power plant systems and processes are described that enable recovery of at least a portion of the fuel storage energy associated with a storage system for supplying fuel to the power plant systems. A first embodiment of an energy-recovery power plant system includes at least one fuel storage container and at least one expander that can receive fuel from the fuel storage container at a first pressure and provide the fuel to the power plant at a second pressure that is lower than the first pressure. A second embodiment of an energy-recovery power plant system includes a first conduit fluidly coupling the fuel storage container and the power plant for delivering fuel from the fuel storage container to the power plant and at least one regenerative thermodynamic cycle engine thermally coupled to the first conduit such that heat may be exchanged between the fuel and a working fluid for the regenerative thermodynamic cycle engine.

24 Claims, 21 Drawing Sheets

U.S. PATENT DOCUMENTS

| | | | |
|---|---|---|---|
| 4,595,642 A | 6/1986 | Nakanishi et al. | |
| 4,759,997 A | 7/1988 | Ohyauchi et al. | |
| 4,781,735 A | 11/1988 | Tagawa | |
| 4,801,308 A | 1/1989 | Keefer | |
| 4,816,121 A | 3/1989 | Keefer | |
| 4,968,329 A | 11/1990 | Keefer | |
| 4,969,935 A | 11/1990 | Hay | |
| 4,988,580 A | 1/1991 | Ohsaki et al. | |
| 5,068,159 A | 11/1991 | Kinoshita | |
| 5,079,103 A | 1/1992 | Schramm | |
| 5,147,735 A | 9/1992 | Ippommatsu et al. | |
| 5,175,061 A | 12/1992 | Hildebrandt et al. | |
| 5,256,172 A | 10/1993 | Keefer | |
| 5,292,598 A | 3/1994 | Rosner | |
| 5,328,503 A | 7/1994 | Kumar | |
| 5,366,818 A | 11/1994 | Wilkinson et al. | |
| 5,408,832 A | 4/1995 | Boffito et al. | |
| 5,411,578 A | 5/1995 | Watson | |
| 5,434,016 A | 7/1995 | Benz et al. | |
| 5,523,176 A | 6/1996 | Fonda-Bonardi | |
| 5,523,326 A | 6/1996 | Dandekar et al. | |
| 5,543,238 A | 8/1996 | Strasser | |
| 5,593,640 A | 1/1997 | Long et al. | |
| 5,604,047 A | 2/1997 | Bellows et al. | |
| 5,645,950 A | 7/1997 | Benz et al. | |
| 5,686,196 A | 11/1997 | Singh et al. | |
| 5,711,926 A | 1/1998 | Knaebel | |
| 5,714,276 A | 2/1998 | Okamoto | |
| 5,811,201 A | 9/1998 | Skowronski | |
| 5,832,728 A | 11/1998 | Buck | |
| 5,867,978 A * | 2/1999 | Klanchar et al. | 60/39.182 |
| 5,900,329 A | 5/1999 | Reiter et al. | |
| 5,917,136 A | 6/1999 | Gaffney et al. | |
| 5,980,857 A | 11/1999 | Kapoor et al. | |
| 5,981,096 A | 11/1999 | Hornburg et al. | |
| 6,045,933 A | 4/2000 | Okamoto | |
| 6,051,050 A | 4/2000 | Keefer et al. | |
| 6,110,612 A | 8/2000 | Walsh | |
| 6,170,264 B1 | 1/2001 | Viteri et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,194,092 B1 | 2/2001 | Ohara et al. | |
| 6,206,630 B1 * | 3/2001 | Feltenberger et al. | |
| 6,283,723 B1 | 9/2001 | Milburn et al. | |
| 6,293,767 B1 * | 9/2001 | Bass | |
| 6,305,442 B1 * | 10/2001 | Ovshinsky et al. | 141/231 |
| 6,312,843 B1 * | 11/2001 | Kimbara et al. | |
| 6,627,338 B2 * | 9/2003 | St-Pierre et al. | |
| 6,854,273 B1 * | 2/2005 | Lasley et al. | 60/646 |
| 2002/0142198 A1 * | 10/2002 | Towler et al. | |

FOREIGN PATENT DOCUMENTS

| | | | |
|---|---|---|---|
| CA | 2016045 | * | 8/1994 |
| CA | 2109055 | * | 2/1999 |
| CA | 2087972 | * | 1/2000 |
| CA | 2087973 | * | 1/2001 |
| DE | 3913581 | * | 10/1990 |
| EP | 0 341 189 A1 | * | 11/1989 |
| EP | 0 143 537 | * | 3/1990 |
| EP | 0 681 860 A2 | * | 11/1995 |
| EP | 0 691 701 A1 | | 1/1996 |
| EP | 1 070 531 A2 | | 1/2001 |
| JP | 62278770 | | 3/1987 |
| JP | 06208853 | | 7/1994 |
| JP | 07094200 | | 4/1995 |
| JP | 07-279758 | | 10/1995 |
| JP | 8045526 A2 | | 2/1996 |
| JP | 11214021 A2 | | 6/1999 |
| JP | 2000-072401 | | 3/2000 |
| WO | WO 95/28510 | | 10/1995 |
| WO | WO 99/46032 | | 9/1999 |
| WO | WO 00/75559 | | 12/2000 |
| WO | WO 00/76630 | | 12/2000 |
| WO | WO 01/00987 | | 1/2001 |
| WO | WO 02/35623 | | 5/2002 |

OTHER PUBLICATIONS

Chatsiriwech et al., "Enhancement of Catalytic Reaction by Pressure Swing Adsoprtion," *Catalysis Today* 20:351-366, 1994.

Hufton et al., "Sorption Enhanced Reaction Process for Hydrogen Production," *AIChE Journal* 45(2):248-256, 1999.

International Search Report from International Application No. PCT/CA02/00032.

Fyke et al., "Recovery of Thermomechanical Exergy From Cryofuels," *Int. J. Hydrogen Engery*. 22(4):435-440, 1997.

Oshima et al., "The utilization of $LH_2$ and LNG cold for generation of electric power by a cryogenic type Stirling Engine," *Cryogenics* 617-620, Nov. 1978.

* cited by examiner

POWER PLANT WITH ENERGY RECOVERY FROM FUEL STORAGE

CROSS REFERENCE TO RELATED APPLICATION

This application is a divisional of U.S. patent application Ser. No. 10/043,727, filed Jan. 8, 2002 now abandoned, which claims priority from prior pending U.S. provisional application No. 60/260,608, filed on Jan. 9, 2001, both of which are incorporated herein by reference.

FIELD

The present disclosure relates to a power plant system that includes a fuel storage system.

BACKGROUND

Fuel cells provide an environmentally friendly source of electrical power. One form of fuel cell used for generating electrical power, particularly for vehicle propulsion and for smaller scale stationary power generation, includes an anode channel for receiving a flow of hydrogen gas, a cathode channel for receiving a flow of oxygen gas, and a polymer electrolyte membrane (PEM) which separates the anode channel from the cathode channel. Oxygen gas entering the cathode reacts with hydrogen ions that cross the electrolyte to generate a flow of electrons. Environmentally safe water vapor is also produced as a byproduct.

Despite the great attractiveness of fueling future mobile and stationary power plants with hydrogen, severe technical and economic barriers are presented by the supply and storage of hydrogen (as either a compressed gas or a cryogenic liquid). A substantial amount of mechanical energy must be invested to compress and/or refrigerate hydrogen fuel being stored in any of these hydrogen storage systems. In the absence of any system for recovering energy as hydrogen fuel is released from storage, this energy loss seriously impairs the overall efficiency and economic viability of the so-called "hydrogen economy", as popularly represented by distributed fuel cell energy systems using hydrogen generated by renewable energy sources such as solar photovoltaic power. In particular, the economic viability of hydrogen and natural gas as fuels particularly for vehicular propulsion has been gravely compromised by the loss of energy required to compress or liquefy these fuels in the fuel supply infrastructure. The prospects for wide application of hydrogen energy systems based on fuel cells could be greatly enhanced by development of a system for recovering "hydrogen storage energy" to improve overall energy efficiency.

Specifically, hydrogen may be stored at substantially ambient temperature as a compressed gas in high-pressure vessels, or in solid solution within a metal hydride canister. Hydrogen may alternatively be stored at low temperatures (e.g., about 77 K to about 200 K) as a compressed gas in contact with an adsorbent (e.g. active carbon), or at much lower temperature (~20 K) as cryogenic liquid. Some researchers are currently investigating hydrogen storage at substantially ambient temperature as a compressed gas in contact with an advanced adsorbent (e.g. nanofiber or nanotube carbon).

Each of the above physical techniques for hydrogen storage requires a substantial investment of "hydrogen storage energy" (typically as compression energy) to achieve the required working storage pressure and to provide any required cryogenic refrigeration. There has been a lack of practical devices and methods for recovering hydrogen storage energy to enhance the performance and efficiency of the fuel cell power plant, particularly for small-scale fuel cell power plants. There are some examples of hydrogen storage energy being recovered for ancillary uses. One example involves recovering a portion of hydrogen storage energy for air conditioning for passenger compartment comfort, where hydrogen fuel being released from cryogenic storage may be used as a refrigerant. Another example involves using the endothermic heat of hydrogen release from a metal hydride as a heat sink.

One way to improve the performance of a PEM fuel cell system is oxygen enrichment of the air supplied to the cathode. Boosting the oxygen partial pressure over the fuel cell cathode will enhance fuel cell stack voltage efficiency at a given current density. Alternatively, oxygen enrichment can enable fuel cell operation at higher current density with reduced voltage drop, thus reducing the size and capital cost of the equipment.

Pressure swing adsorption (PSA) systems can provide a continuous supply of enriched oxygen while also removing any contaminant gas or vapor components that may be detrimental to the fuel cell. PSA systems (including vacuum pressure swing adsorption systems (VPSA)) separate gas fractions from a gas mixture by coordinating pressure cycling and flow reversals over an adsorber or adsorbent bed that preferentially adsorbs a more readily adsorbed gas component relative to a less readily adsorbed gas component of the mixture. The total pressure of the gas mixture in the adsorber is elevated while the gas mixture is flowing through the adsorber from a first end to a second end thereof, and is reduced while the gas mixture is flowing through the adsorbent from the second end back to the first end. As the PSA cycle is repeated the less readily adsorbed component is concentrated adjacent to the second end of the adsorber, while the more readily adsorbed component is concentrated adjacent to the first end of the adsorber. As a result, a "light" product (a gas fraction depleted in the more readily adsorbed component and enriched in the less readily adsorbed fraction, here oxygen and argon) is delivered from the second end of the adsorber, and a "heavy" product (a gas fraction enriched in the strongly adsorbed components, here nitrogen, water vapor, carbon dioxide, and any contaminants) is exhausted from the first end of the adsorber.

The conventional system for implementing pressure swing adsorption or vacuum pressure swing adsorption uses two or more stationary adsorbers in parallel, with directional valving at each end of each adsorber to connect the adsorbers in alternating sequence to pressure sources and sinks. This system is often cumbersome and expensive to implement due to the large size of the adsorbers and the complexity of the valving required. Further, the conventional PSA system makes inefficient use of applied energy because of irreversible gas expansion steps as adsorbers are cyclically pressurized and depressurized within the PSA process. Conventional PSA systems could not be applied to fuel cell power plants for vehicles, as such PSA systems are far too bulky and heavy because of their low cycle frequency and consequently large adsorbent inventory.

A serious challenge for oxygen enrichment by PSA or VPSA using nitrogen-selective zeolite adsorbents arises from the strongly hydrophilic nature of those adsorbents. Water adsorption from atmospheric humidity will deactivate the adsorbent. For continuously operating industrial PSA plants, this problem is solved by using the feed end of the adsorbent bed (typically loaded with alumina desiccant) to dry the feed air. In intermittent operation, adsorbed water in the desiccant layer may diffuse into the nitrogen-selective adsorbent zone and cause deactivation of that adsorbent during shutdown intervals. Hence, it is very desirable that as much water as possible be removed from the feed air before that air enters the PSA unit, in order to reduce the humidity challenge to satisfactory sustained operation of the PSA under intermittent operating conditions.

SUMMARY

Various power plant systems and processes are described herein that enable recovery of at least a portion of the fuel storage energy associated with a storage system for supplying fuel to the power plant systems. In particular, a first embodiment of an energy-recovery power plant system includes at least one fuel storage container and at least one expander that can receive fuel from the fuel storage container at a first pressure and provide the fuel to the power plant at a second pressure that is lower than the first pressure. A second embodiment of an energy-recovery power plant system includes a first conduit fluidly coupling the fuel storage container and the power plant for delivering fuel from the fuel storage container to the power plant and at least one regenerative thermodynamic cycle engine thermally coupled to the first conduit such that heat may be exchanged between the fuel and a working fluid for the regenerative thermodynamic cycle engine. An expander and a regenerative thermodynamic cycle engine may be combined for energy recovery from cryogenic fuel storage in a single power plant system.

In such power plant systems, mechanical power and/or thermal energy may be recovered from the fuel storage systems. For example, a process is disclosed herein that involves providing a compressed fuel gas or a cryogenic liquid fuel, releasing the fuel from a fuel storage system, and generating mechanical power and/or a refrigeration effect from the releasing of the fuel.

The disclosed power plant systems and processes are particularly useful for electrical current generating systems that include a fuel cell. Certain versions of such systems can include at least one oxidant gas delivery system that can produce oxidant-enriched gas for delivery to the fuel cell. The oxidant gas delivery system may be a pressure swing adsorption system that includes at least one device that is coupled to (and at least in part powered by) the expander and/or regenerative thermodynamic cycle engine.

Also described are processes for providing hydrogen to fuel cells in such electrical current generating systems. One disclosed process scheme involves releasing hydrogen from a hydrogen fuel storage system to provide a compressed hydrogen gas stream, introducing the compressed hydrogen gas stream into at least one expander resulting in a lower-pressure hydrogen gas stream, and introducing the lower-pressure hydrogen gas stream into a fuel cell. Another disclosed process scheme includes providing a regenerative thermodynamic cycle engine having a working fluid. Heat is transferred from the regenerative thermodynamic cycle engine working fluid to the hydrogen stream and heat is transferred from an air feed stream to the regenerative thermodynamic cycle engine working fluid. The air feed stream may be introduced into the fuel cell.

The foregoing features will become more apparent from the following detailed description of several embodiments that proceeds with reference to the accompanying figures.

DETAILED DESCRIPTION OF SEVERAL EMBODIMENTS

Figure 1:
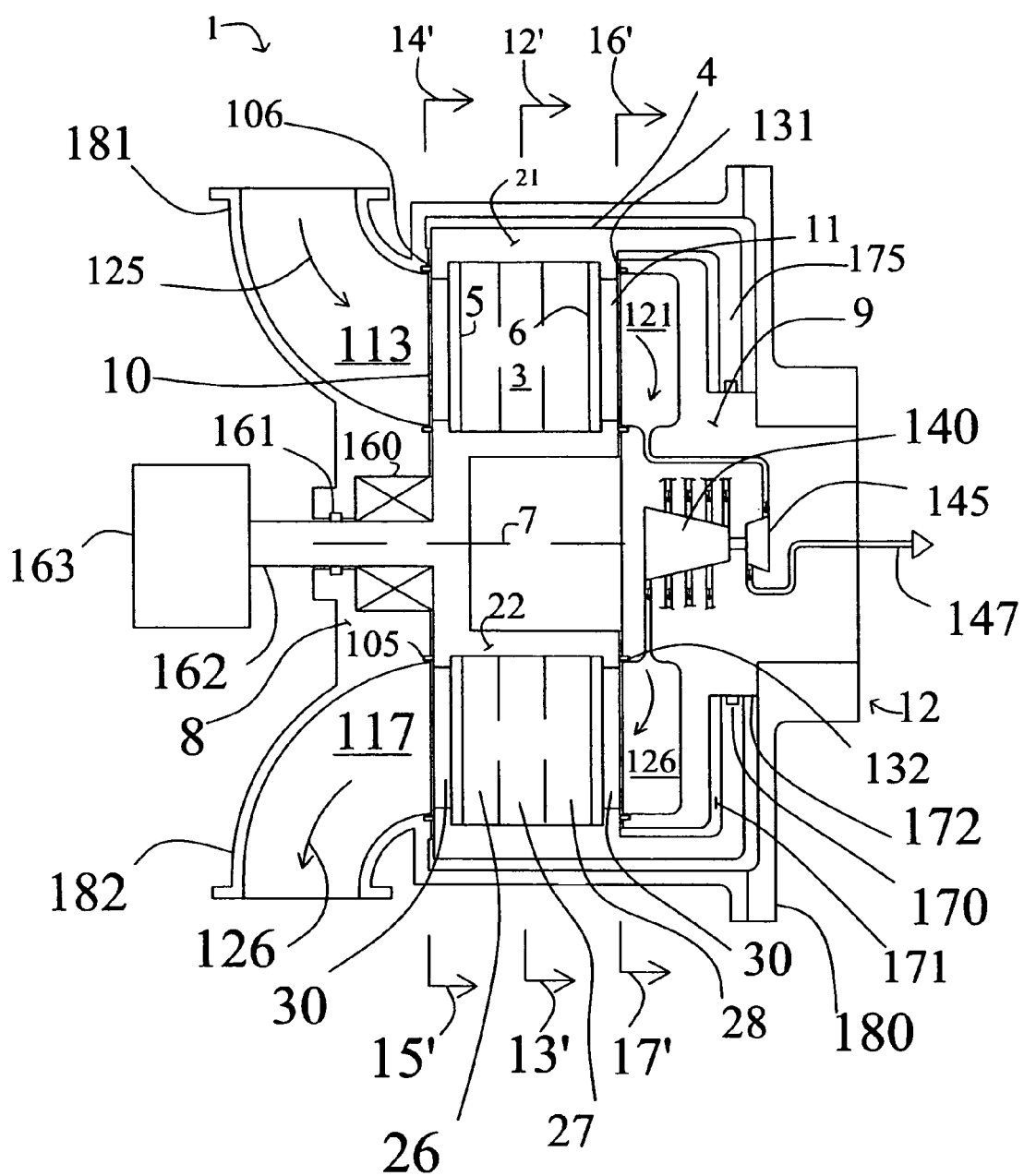
FIG. 1 shows an axial section of a rotary PSA module.

Representative embodiments are described below with reference to the drawings. The following definitions are provided solely to aid the reader, and should not be construed to have a scope less than that understood by a person of ordinary skill in the art or as limiting the scope of the appended claims.

"Ambient pressure" denotes about 1.0 bar absolute with allowance for changes of elevation and barometric conditions.

"Ambient temperature" denotes about −40 to about 35° C.

"Light gas or light product" denotes gas enriched in a less readily adsorbed component.

"Rotary bed pressure swing adsorption apparatus" is an adsorption apparatus where adsorbers with adsorbent material are rotated relative to stationary valves for introducing and withdrawing gas streams.

"Rotary valve pressure swing adsorption apparatus" is an apparatus where valves for introducing and withdrawing gas streams are rotated relative to stationary adsorbers housing adsorbent material.

"Rotary pressure swing adsorption" includes, but is not limited to, a rotary bed pressure swing adsorption apparatus, a rotary valve pressure swing adsorption apparatus, or a pressure swing adsorption apparatus that includes rotating adsorbers and rotating valves.

The disclosed systems and processes may be applied more generally to recovery of energy (both as mechanical work and as refrigeration) from compressed gas or cryogenic liquids for fuel cell power plants and combustion engine power plants. The recovered energy typically is at least a portion of the energy initially required to compress or liquefy these fuels in the fuel supply infrastructure. Recovery of such "fuel storage energy" involves recovering at least a portion of the energy available when the fuel is released from the fuel storage system to the fuel delivery system.

The fuel storage system may be any system that stores a volume of fuel for delivery to a fuel cell or a combustion engine. According to particular embodiments, the stored fuel is any type of substance that exists as a gas at ambient temperature and pressure conditions, but that is stored in the fuel storage system as a compressed gas, a compressed liquid, a cryogenic liquid, a compressed cryogenic liquid, a sorbate on a physical adsorbent at ambient or cryogenic temperature, or a metal hydride compound. Examples of such fuels include hydrogen, natural gas, methane, and propane. The compressed gas (e.g., hydrogen or methane) typically is stored at ambient temperature at a pressure of greater than about 100 bars and up to about 700 bars absolute in the case of hydrogen.

The fuel storage system can include any devices or mechanisms capable of providing the fuel to the fuel delivery system at a pressure greater than ambient pressure. For example, the fuel storage system may include at least one container for the fuel such as a pressure vessel for compressed gas, a dewar for liquefied gas, a canister for a gas sorbent, or a container for a hydrogen gas-producing substance. Alternatively, the fuel storage system could include a pipeline as a pressure vessel container in instances of remote or distributed power plant systems. The fuel storage system also includes a mechanism for releasing the fuel to the fuel delivery system. Such fuel release mechanism may include valves, flow controllers and similar devices that can provide controlled release of a compressed gas or cryogenic liquid. Fuel also could be released by a mechanical device (e.g., a piston) coupled to the expander. Additional possible fuel release mechanisms include devices that trigger the fuel release by conditioning the fuel such as, for example, a heat exchanger to raise the temperature of the fuel for desorbing the fuel from a sorbent under pressure. The fuel storage system fluidly communicates with the fuel delivery system via the fuel release mechanism system and, typically, at least one conduit.

The fuel delivery system may include any type of device useful to transport or propel the fuel through the overall fuel cell system or combustion engine system and/or any type of device useful to enhance the fuel quality. Illustrative fuel transport devices include compressors and pumps for fuel to be pressurized, and expanders for fuel gas to be depressurized. Illustrative fuel enhancement devices include fuel purification devices such as adsorption modules, filters, gas separation membranes, desiccant traps, and pumps or mixers for mixing additional components with the fuel.

The energy recovered from release of the fuel from the fuel storage system can be converted into energy that is useful to the fuel delivery system, or to deliver energy supplemental to the power plant. For example, the recovered energy may be converted into mechanical power for driving at least one fuel transport device. Another example contemplates converting the recovered energy into refrigeration for improving the performance of at least one fuel enhancement device.

According to one embodiment, an energy-recovery expander is utilized to convert the fuel storage energy into mechanical power. In particular, the expander receives fuel from the fuel storage system wherein the fuel is at a first higher pressure. The first pressure may be the storage pressure of compressed fuel gas, or a desorption pressure achieved by warming an adsorbent or metal hydride containing the fuel gas, or a pressure attained by pumping the fuel from storage as a cryogenic liquid before vaporization. The fuel is typically in a gaseous state as it enters the expander. The expander reduces the gas pressure by allowing the gas to expand approximately isentropically. Thus, the fuel gas exits the expander at a second lower pressure. The expander extracts work from the pressurized fuel gas while expanding the gas. According to certain presently disclosed embodiments, the work obtained from the expander is converted to mechanical power by coupling the expander to a mechanical load such as a compressor, a vacuum pump, a liquid pump (e.g., a coolant pump for the fuel cell), electric generator, an adsorber rotor, or a propulsion device such as wheels of a road or rail vehicle incorporating the disclosed power plant systems. The coupling may be, for example, a mechanical coupling, an electrical coupling, or a combination of mechanical and electrical coupling.

Any type of expander may be used in the disclosed systems and processes. Illustrative expanders include positive displacement expanders and impulse turbines. Positive displacement expanders typically include at least one chamber that receives the gas wherein one or more walls or surfaces of the chamber can move under the gas pressure, thus expanding the volume of the chamber. The positive displacement expanders may be provided with sequentially increasing displacement toward the lowest pressure stage or as a rotary positive displacement expander for each stage. Examples of such expanders include a multistage piston expansion machine wherein the first stage cylinder is smaller than the cylinders of subsequent expansion stages, with the displacement of each stage approximately proportional to the intake pressure of the gas to that stage. Alternative rotary positive displacement devices (also known as rotary engines) include scroll machines, twin screw machines, and other machines with twin contra-rotating and intermeshing rotors.

The impulse turbines may be provided with stages having partial admission nozzles, and operating at very high speed, for example 100,000 RPM in the case of low molecular weight of hydrogen. For example, a three stage impulse turbine may have three separate wheels, each with a partial admission nozzle. Alternatively, the impulse turbine for several stages may have one wheel using re-entry nozzles and return ducts to define the separate stages of expansion in the wheel over corresponding angular sectors of the casing, as described for two or three stages by O. E. Balje in section 5.2.3 of "Turbomachines" (Wiley-Interscience, 1981).

The disclosed systems and process are particularly useful in power plants that include a PSA (e.g., VPSA) oxidant enrichment system, especially an oxygen enrichment system. The recovered mechanical work assists powering of any part or device of the PSA system such as a feed air compressor, vacuum pump, rotary adsorbent bed and rotary adsorber valve. In addition, refrigeration obtained by release and expansion of the stored hydrogen or natural gas is applied to cooling and drying of feed air to the PSA (e.g., VPSA) unit. There are numerous applications where oxygen enrichment may improve the performance of a fuel cell or engine power plant. Hence, the efficiency of fuel cell or engine power plants fueled by hydrogen or natural gas can be significantly improved by the recovery of mechanical expansion energy and refrigeration from the hydrogen or natural gas storage system.

According to certain embodiments, the disclosed methods and systems enable recovery of a portion of the fuel storage energy to be expanded as mechanical energy to compress air into the fuel cell air handling sub-system, which is preferably provided as a pressure swing adsorption (PSA) oxygen concentrator. Mechanical power that is generated as hydrogen is released from storage may be applied, for example, to drive any mechanical-powered or -driven apparatus such as a compressor, blower pump, vacuum pump, or propulsion means of a vehicle incorporating the power plant. According to one example, the generated mechanical power can drive or assist driving a feed air blower for the oxygen PSA, as well as optionally a vacuum pump for reducing the adsorber regeneration pressure of the PSA which is then operating as "vacuum pressure swing adsorption" (VPSA). Oxygen generation by VPSA is more energy efficient than by PSA, as fractional yield of oxygen from air is enhanced by vacuum.

Methods and systems for cooling of feed air to the PSA or VPSA unit are also described. The cooling effect is provided by expansion of stored hydrogen and, in certain embodiments, as refrigeration provided directly from release of cold hydrogen from a cryogenic hydrogen storage system. Refrigeration may also be provided by the endothermic uptake of heat by a hydrogen storage adsorbent bed or metal hydride bed. Cooling the feed air will reduce its saturation humidity in relation to the degree of cooling, reduce the volume flow to be compressed resulting in reduced compression power load, and reduce the need for radiator cooling to reject waste heat from fuel cell power plants on vehicles. Moreover, this cooling of the feed air further reduces or eliminates the need for after cooling of the compressed air before being admitted to the PSA unit. In addition, the cooling could be employed to cool a combustion engine or fuel cell coolant.

Direct expansion and regenerative thermodynamic cycle embodiments are disclosed for recovery of mechanical work from release of hydrogen from cryogenic liquid storage. Illustrative regenerative thermodynamic cycles include regenerative Brayton cycles and Stirling cycles. These embodiments may be used in a refrigeration mode to augment the cooling of feed air to the PSA unit and the fuel cell. Direct expansion and regenerative thermodynamic cycle systems may also be used to recover waste heat from the fuel cell stack, from exhaust streams from the fuel cell, or combustion of the anode exhaust gas. Such fuel cell energy recovery systems can augment the amount of mechanical energy obtained from recovery of hydrogen storage energy, condense and recover water from the fuel cell exhaust, and reduce the fuel cell cooling load for vehicle applications.

According to a further embodiment that does not include a PSA module, the expander is fluidly coupled to the fuel cell to deliver the fuel directly from the expander to the fuel cell. In the case of hydrogen fuel and a polymer electrolyte membrane fuel cell, the expander is fluidly coupled to the fuel cell anode. The expander may be mechanically coupled to (and thus power) a compressor that delivers an air feed gas directly to the fuel cell cathode without any oxygen-enrichment by a PSA module.

A particularly useful electrical current generating system may include a PEM fuel cell, an oxygen gas delivery system, and a hydrogen gas delivery system. The PEM fuel cell includes an anode channel having an anode gas inlet for receiving a supply of hydrogen gas, a cathode channel having a cathode gas inlet and a cathode gas outlet, and an electrolyte in communication with the anode and cathode channel for facilitating ion transport between the anode and cathode channel. The oxygen gas delivery system is coupled to the cathode gas inlet and delivers air or oxygen (e.g. oxygen enriched air) to the cathode channel.

The oxygen gas delivery system may simply be an air blower. However, for superior performance it incorporates an oxygen pressure swing adsorption system, preferably including a rotary pressure swing adsorption module for enriching oxygen gas from air. The rotor includes a number of adsorbers with flow paths between respectively first and second ends of the adsorbers and with adsorbent material therein for preferentially adsorbing a first gas component in response to increasing pressure in the flow paths relative to a second gas component. The pressure swing adsorption system also may include compression machinery coupled to the rotary module for facilitating gas flow through the flow paths for separating the first gas component from the second gas component. The stator includes a first stator valve surface, a second stator valve surface, and a plurality of function compartments opening into the stator valve surfaces. The function compartments include a gas feed compartment, a light reflux exit compartment and a light reflux return compartment.

In one variation, the compression machinery comprises a compressor for delivering pressurized air to the gas feed compartment, and a light reflux expander coupled between the light reflux exit compartment and the light reflux return compartment. The gas recirculating means comprises a compressor coupled to the light reflux expander for supplying oxygen gas, exhausted from the cathode gas outlet, under pressure to the cathode gas inlet. As a result, energy recovered from the pressure swing adsorption system can be applied to boost the pressure of oxygen gas delivered to the cathode gas inlet.

The oxygen gas delivery system is coupled to the cathode gas inlet and delivers oxygen gas to the cathode channel. The hydrogen gas delivery system supplies purified hydrogen gas to the anode gas inlet, and may have provision for recirculating hydrogen gas from the anode gas exit back to the anode gas inlet so as to maintain adequate humidity at the anode gas inlet. The hydrogen gas delivery system is fluidly coupled with the hydrogen fuel storage system.

In one embodiment, the oxygen gas separation system comprises an oxygen pressure swing adsorption system, including a rotary module having a stator and a rotor rotatable relative to the stator. The rotor includes a number of adsorbers for preferentially adsorbing a first gas component in response to increasing pressure in the flow paths relative to a second gas component. The function compartments include a gas feed compartment and a heavy product compartment. Alternatively, the adsorbers may be stationary, with cooperating first and second rotary distributor valves respectively for admitting feed air and releasing nitrogen enriched exhaust from the first ends of the adsorbers, and for delivering oxygen enriched gas from the second ends of the adsorbers.

In one variation, the oxygen pressure swing adsorption system includes a compressor coupled to the gas feed compartment for delivering pressurized air to the gas feed compartment, and a vacuum pump coupled to the compressor for extracting nitrogen product gas from the heavy product compartment. Most PEM fuel cell systems operate at ambient to about 3 bars pressure. As feed pressure and the overall working pressure ratio of the PSA are reduced, productivity and recovery of a simple cycle deteriorate. At very low feed pressures (e.g. 2-3 bars), the PSA may need supplemental vacuum pumping to widen the working pressure ratio and achieve high recovery. In typical conventional PEM fuel cell fuel cell systems, all mechanical power for air handling compression and any oxygen PSA units must be provided as electrical power by the appropriately sized fuel cell stack. In the presently disclosed systems and processes, the recovered mechanical energy can be employed to at least partially power the compressor and/or vacuum pump.

As mentioned above, the disclosed processes and systems also are applicable to combustion engine systems, particularly combustion engine systems that include a PSA module and utilize hydrogen and/or oxygen as combustion fuel. Illustrative combustion engine systems are described in commonly assigned, co-pending U.S. patent application entitled "Feed Composition Modification for Internal Combustion Engines" filed Oct. 26, 2001, the disclosure of which is incorporated herein by reference.

FIGS. 1-5

FIG. 1 shows a rotary PSA module 1, which includes a number "N" of adsorbers 3 in adsorber housing body 4. Each adsorber has a first end 5 and a second end 6, with a flow path therebetween contacting a nitrogen-selective adsorbent (for oxygen enrichment). The adsorbers are deployed in an asymmetric array about axis 7 of the adsorber housing body. The housing body 4 is in relative rotary motion about axis 7 with first and second functional bodies 8 and 9, being engaged across a first valve face 10 with the first functional body 8 to which feed gas mixture is supplied and from which the heavy product is withdrawn, and across a second valve face 11 with the second functional body 9 from which the light product is withdrawn.

In embodiments as particularly depicted in FIGS. 1-5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. According to alternative embodiments, the adsorber housing 4 may be stationary, while the first and second functional bodies are rotary distributor valves.

In the embodiment shown in FIGS. 1-5, the flow path through the adsorbers is parallel to axis 7, so that the flow direction is axial, while the first and second valve faces are shown as flat annular discs normal to axis 7. However, more generally the flow direction in the adsorbers may be axial or radial, and the first and second valve faces may be any figure of revolution centred on axis 7. The steps of the process and the functional compartments to be defined will be in the same angular relationship regardless of a radial or axial flow direction in the adsorbers.

FIGS. 2-5 are cross sections of module 1 in the planes defined by arrows 12'-13', 14'-15', and 16'-17'. Arrow 20 in each section shows the direction of rotation of the rotor 4.

Figure 2:
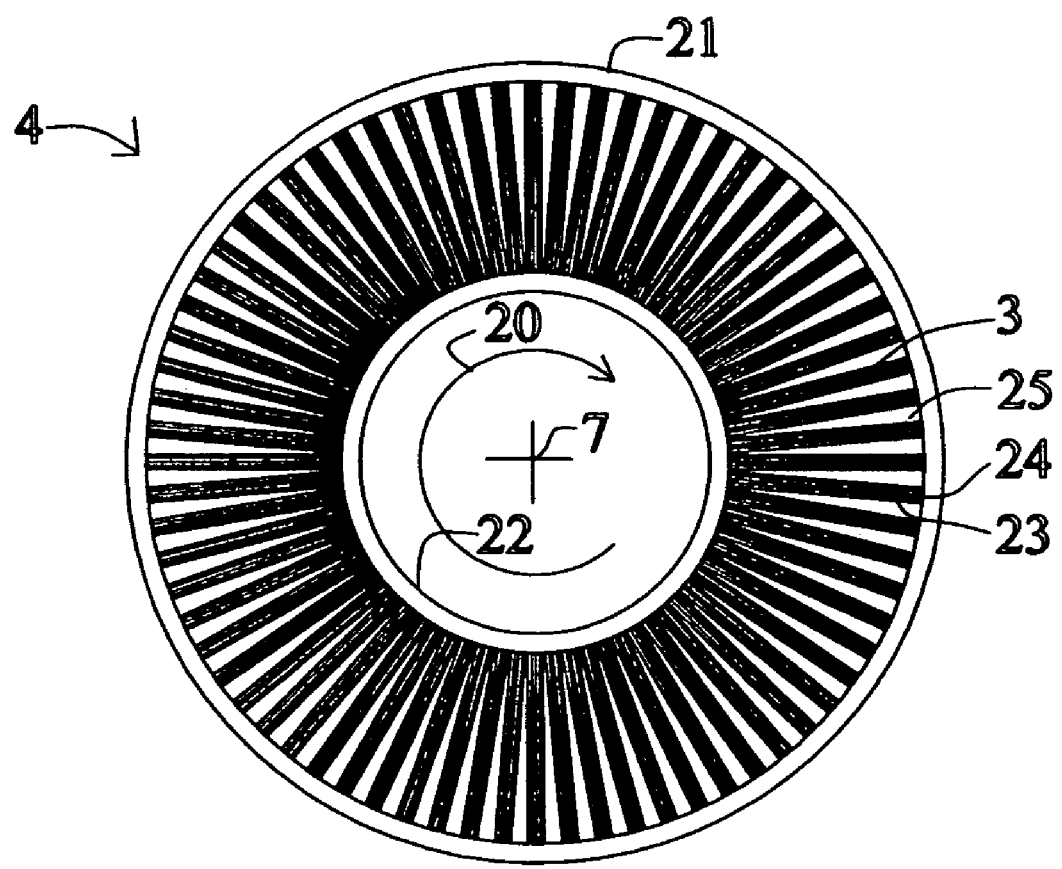
FIGS. 2 through 5B show transverse sections of the module of FIG. 1.

FIG. 2 shows section 12'-13' across FIG. 1, which crosses the adsorber rotor. In this example, "N"=72. The adsorbers 3 are mounted between outer wall 21 and inner wall 22 of adsorber wheel 208. Each adsorber comprises a rectangular flat pack 3 of adsorbent sheets 23, with spacers 24 between the sheets to define flow channels here in the axial direction. Separators 25 are provided between the adsorbers to fill void space and prevent leakage between the adsorbers. In other configurations, the adsorbent sheets may be formed in curved packs or spiral rolls.

Satisfactory adsorbent sheets have been made by coating a slurry of zeolite crystals with binder constituents onto the reinforcement material, with successful examples including non-woven fibreglass scrims, woven metal fabrics, and expanded aluminium foils. The adsorbent sheets comprise a reinforcement material, in preferred embodiments glass fibre, metal foil or wire mesh, to which the adsorbent material is attached with a suitable binder. For applications such as hydrogen purification, some or all of the adsorbent material may be provided as carbon fibers, in woven or nonwoven form to serve as its own reinforcement material. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fibreglass scrims, and metal foils with etched flow channels in a photolithographic pattern. The active adsorbent may be supported on thin adsorbent sheets which are layered and spaced apart by spacers defining flow channels, so as to provide a high surface area parallel passage support with minimal mass transfer resistance and flow channel pressure drop. With crystalline adsorbents such as zeolites, and amorphous adsorbents such as alumina gel or silica gel, the adsorbent sheet may be formed by coating or in-situ synthesis of the adsorbent on a reinforcement sheet of inert material, e.g. a wire mesh, a metal foil, a glass or mineral fiber paper, or a woven or non-woven fabric. Adsorbers made from the layered adsorbent sheet material may be formed by stacking flat or curved sheets; or by forming a spiral roll, with the flow channels between the sheets extending from the first end of the adsorber to the second end thereof; to fill the volume of the adsorber housing of the desired shape. Examples of method and structures with packed, spirally wound adsorbents are disclosed in commonly-owned, co-pending U.S. Provisional Application No. 60/285,527, filed Apr. 20, 2001, and incorporated herein by reference.

Typical thickness of the adsorbent sheet may be in the range of about 100 to about 200 microns, while flow channel spacing between the sheets may be in the range of about 50 to about 200 microns. Typical experimental sheet thicknesses have been 150 microns, with spacer heights in the range of 100 to 150 microns, and adsorber flow channel length approximately 20 cm. Using X type zeolites, excellent performance has been achieved in oxygen separation from air and hydrogen purification from reformate at PSA cycle frequencies in the range of 1 to at least 150 cycles per minute, particularly at least 25 cycles per minute.

The adsorbent material contacting the flow channels between the first and second ends of the adsorbers may generally be selected to be different in distinct zones of the flow channels, so that the adsorbers would have a succession of zones (e.g. a first zone, a second zone, a third zone, a perhaps additional zones) with distinct adsorbents proceeding along the flow channels from the first end to the second end. In a typical embodiment, the adsorbent in a first zone of the adsorbers adjacent the first end will be a desiccant to achieve bulk removal of water vapor in that first zone, the adsorbent in a second zone in the central portion of the adsorbers will be selected to achieve bulk removal of nitrogen and any contaminant gas components, and the adsorbent in a third zone of the adsorbers will be selected to achieve further removal of nitrogen. A suitable desiccant for the first zone is alumina gel. Suitable adsorbents for the second zone include 13X, or 5A, or Ca-X, or Ca-LSX zeolites. Suitable adsorbents for the third zone include strongly nitrogen selective adsorbents selected from the group including but not limited to Ca-LSX, Li-LSX, Li-exchanged chabazite, Ca-exchanged chabazite, and Sr-exchanged chabazite. The zeolite adsorbents of this group are characterized by strong hydrophilicity, corresponding to selectivity for polar molecules. The second and third zones may be consolidated as a single zone using a single adsorbent composition. High performance conventional adsorbents will operate most effectively at relatively lower temperatures such as about 50-60° C. for Li-LSX or about 60-80° C. for Ca-LSX. Best performance for Na-X (13X) or Na-LSX may be achieved at much lower temperatures around approximately 0° C., indicating a benefit for refrigeration of the feed air with such adsorbents. Certain advanced zeolite adsorbents such as Ca- or Sr-exchanged chabazite may be advantageously effective for nitrogen removal at temperatures of about 100° C.

With specific reference to FIG. 1, the adsorbers 3 comprise a plurality of distinct zones between the first end 5 and the second end 6 of the flow channels, here shown as three zones—a first zone 26 adjacent the first end 5, a second zone 27 in the middle of the adsorbers, and a third zone 28 adjacent the second end 6. The first zone typically contains an adsorbent or desiccant selected for removing very strongly adsorbed components of the feed gas mixture, such as water or methanol vapour, and some carbon dioxide. The second zone contains an adsorbent typically selected for bulk separation of impurities at relatively high concentration, and the third zone contains an adsorbent typically selected for polishing removal of impurities at relatively low concentration.

Particularly in the first zone of the adsorber, the adsorbent must be compatible with significant concentrations of water vapor.

In embodiments with three zones, the first zone may be the first 10% to 20% of the flow channel length from the first end, the second zone may be the next roughly 40% to 50% of the channel length, and the third zone the remainder. In embodiments with only two adsorber zones, the first zone may be the first 10% to 30% of the flow channel length from the first end, and the second zone the remainder. The zones may be formed by coating the different adsorbents onto the adsorbent support sheet material in bands of the same width as the flow channel length of the corresponding zone. The adsorbent material composition may change abruptly at the zone boundary, or may blend smoothly across the boundary. As an alternative to distinct zones of adsorbents, the different adsorbents may be provided in layers or mixtures that include varying gradients of adsorbent concentrations along the gas flow path. A further option is to provide a mixture of the different adsorbents that may or may not be homogenous.

For air separation to produce enriched oxygen, alumina gel may be used in the first zone to remove water vapour, while typical adsorbents in the second and third zones are X, A or chabazite type zeolites, typically exchanged with lithium, calcium, strontium, magnesium and/or other cations, and with optimised silicon/aluminium ratios as well known in the art. The zeolite crystals are bound with silica, clay and other binders, or self-bound, within the adsorbent sheet matrix.

Figure 3:
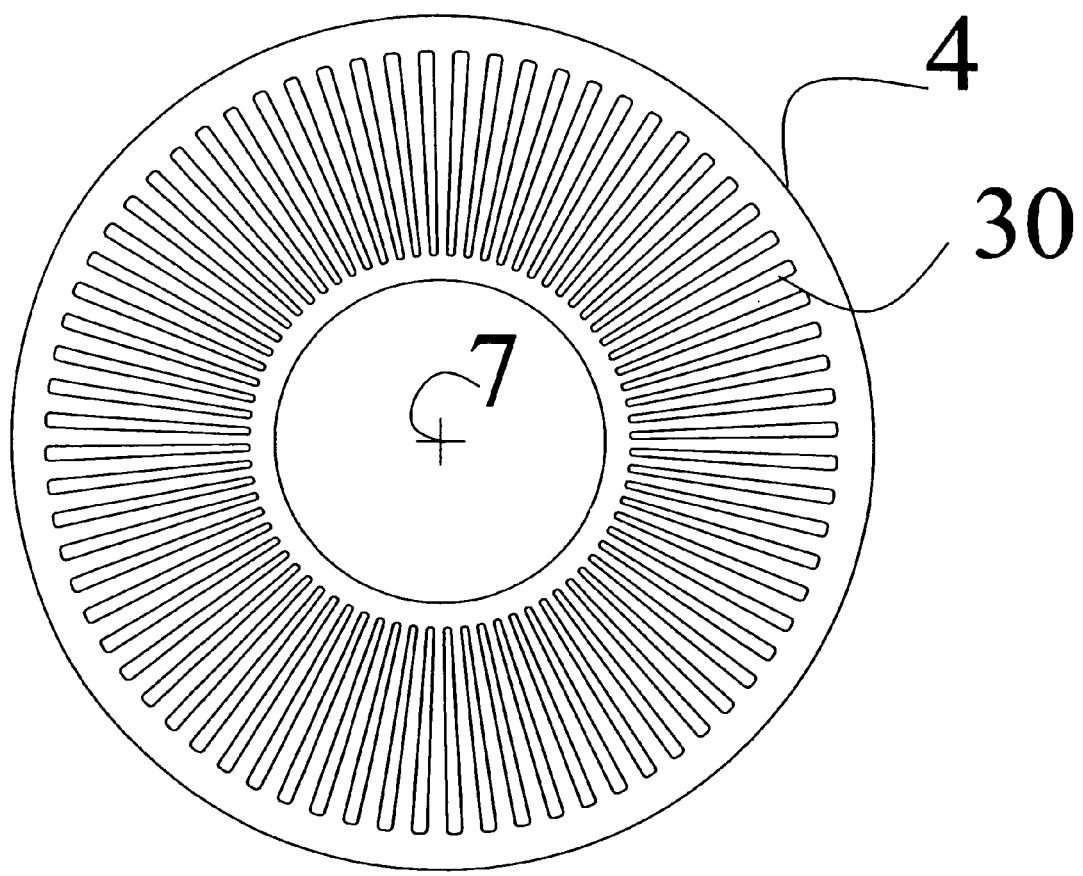

FIG. 3 shows the porting of rotor 4 in the first and second valve faces respectively in the planes defined by arrows 14'-15', and 16'-17'. An adsorber port 30 provides fluid communication directly from the first or second end of each adsorber to respectively the first or second valve face.

Figure 4A:
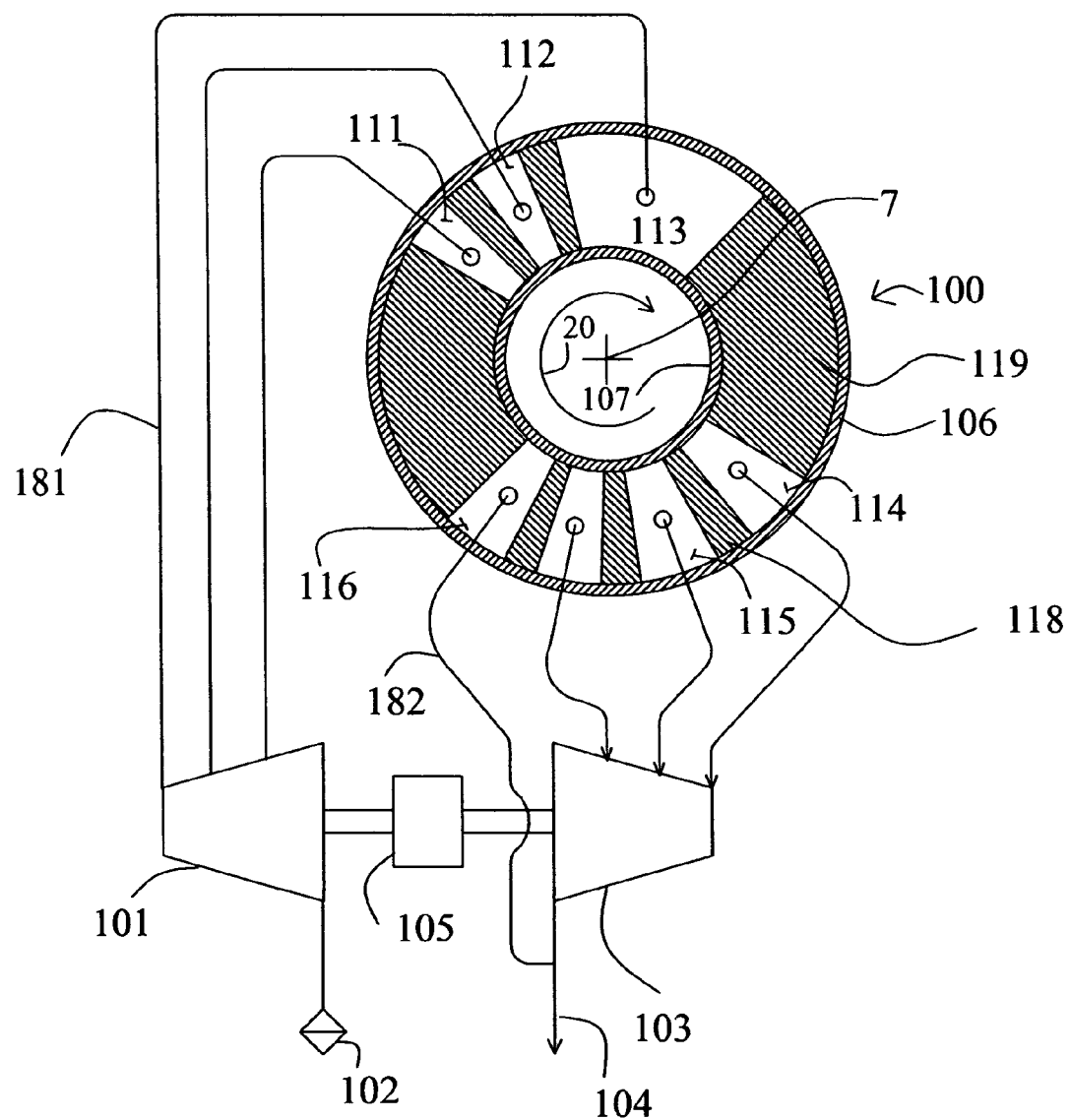
Figure 4B:
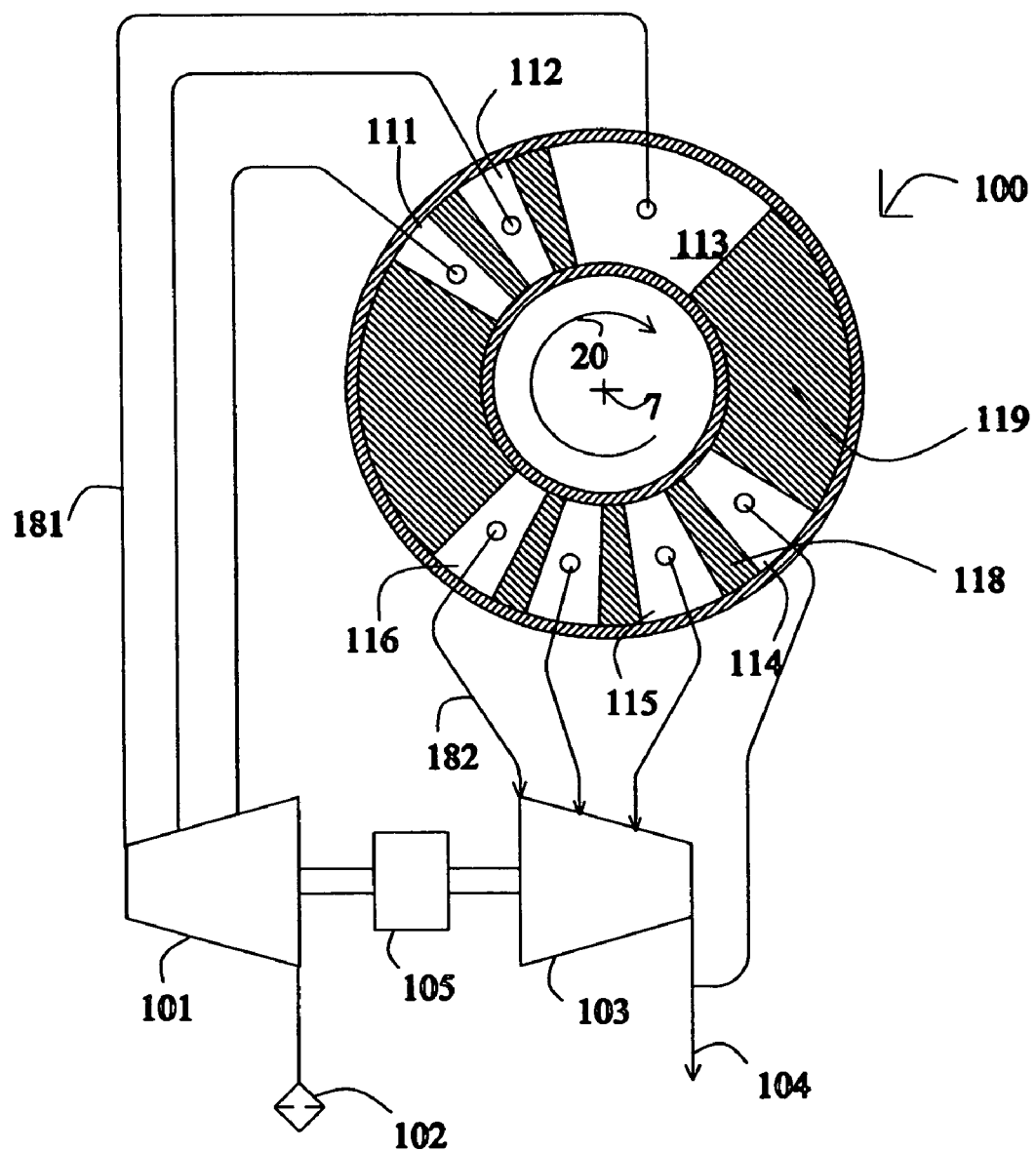

FIGS. 4A and 4B show the first stator valve face 100 of the first stator 8 in the first valve face 10, in the plane defined by arrows 14'-15'. Fluid connections are shown to a feed compressor 101 inducting feed gas from inlet filter 102, and to an exhauster 103 delivering second product to a second product delivery conduit 104. Compressor 101 and exhauster 103 are shown coupled to a drive motor 105.

Arrow 20 indicates the direction of rotation by the adsorber rotor. In the annular valve face between circumferential seals 106 and 107, the open area of first stator valve face 100 ported to the feed and exhaust compartments is indicated by clear angular segments 111-116 corresponding to the first functional ports communicating directly to functional compartments identified by the same reference numerals 111-116. The substantially closed area of valve face 100 between functional compartments is indicated by hatched sectors 118 and 119 that are slippers with zero clearance, or preferably a narrow clearance to reduce friction and wear without excessive leakage. Typical closed sector 118 provides a transition for an adsorber, between being open to compartment 114 and open to compartment 115. A gradual opening is provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor provides feed gas to feed pressurization compartments 111 and 112, and to feed production compartment 113. Compartments 111 and 112 have successively increasing working pressures, while compartment 113 is at the highest working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors or compression cylinders in parallel, each delivering feed air to the working pressure of a compartment 111 to 113. Alternatively, compressor 101 may deliver all the feed gas to the higher pressure, with throttling of some of that gas to supply feed pressurization compartments 111 and 112 at their respective intermediate pressures.

Similarly, exhauster 103 exhausts heavy product gas from countercurrent blowdown compartments 114 and 115 at the successively decreasing working pressures of those compartments, and finally from exhaust compartment 116 which is at the lowest pressure of the cycle. Similarly to compressor 101, exhauster 103 may be provided as a multistage or split stream machine, with stages in series or in parallel to accept each flow at the appropriate intermediate pressure descending to the lowest pressure.

In the example embodiment of FIG. 4A, the lowest pressure is ambient pressure, so exhaust compartment 116 communicates directly to heavy product delivery conduit 104. Exhauster 103 thus is an expander that provides pressure letdown with energy recovery to assist motor 105 from the countercurrrent blowdown compartments 114 and 115. For simplicity, exhauster 103 may be replaced by throttling orifices as countercurrent blowdown pressure letdown means from compartments 114 and 115.

In some embodiments, the lowest pressure of the PSA cycle is subatmospheric. Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lowest pressure which is the deepest vacuum pressure. In FIG. 4B, the early countercurrent blowdown stream from compartment 114 is released at ambient pressure directly to heavy product delivery conduit 104. If for simplicity a single stage vacuum pump were used, the countercurrent blowdown stream from compartment 115 would be throttled down to the lower pressure over an orifice to join the stream from compartment 116 at the inlet of the vacuum pump.

If the feed gas is provided at an elevated pressure at least equal to the highest pressure of the PSA cycle, compressor 101 would be eliminated. To reduce energy losses from irreversible throttling over orifices to supply feed pressurization compartments, the number of feed pressurization stages may be reduced, so that adsorber repressurization is largely achieved by product pressurization, by backfill from light reflux steps. Alternatively, compressor 101 may be replaced in part by an expander which expands feed gas to a feed pressurization compartment from the feed supply pressure of the highest pressure to the intermediate pressure of that compartment, so as to recover energy for driving a vacuum pump 103 which reduces the lowest pressure below ambient pressure so as to enhance the PSA process performance.

Figure 5A:
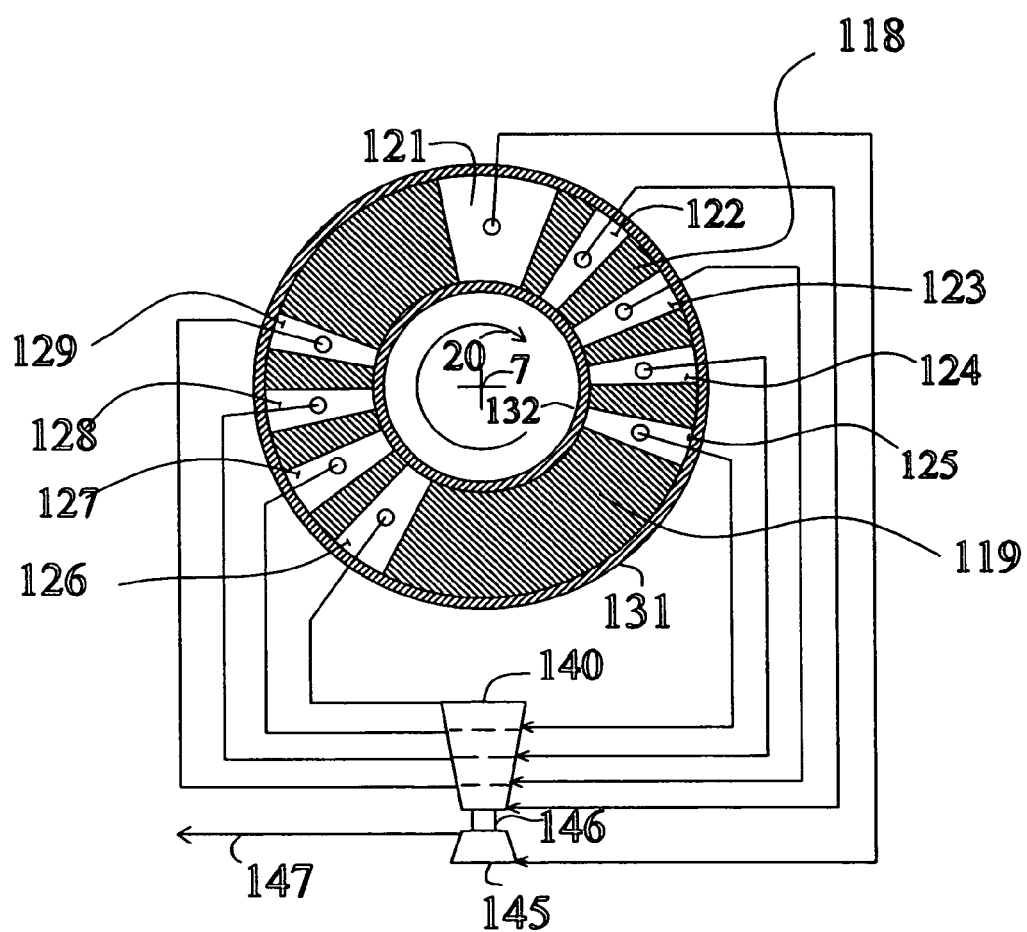
Figure 5B:
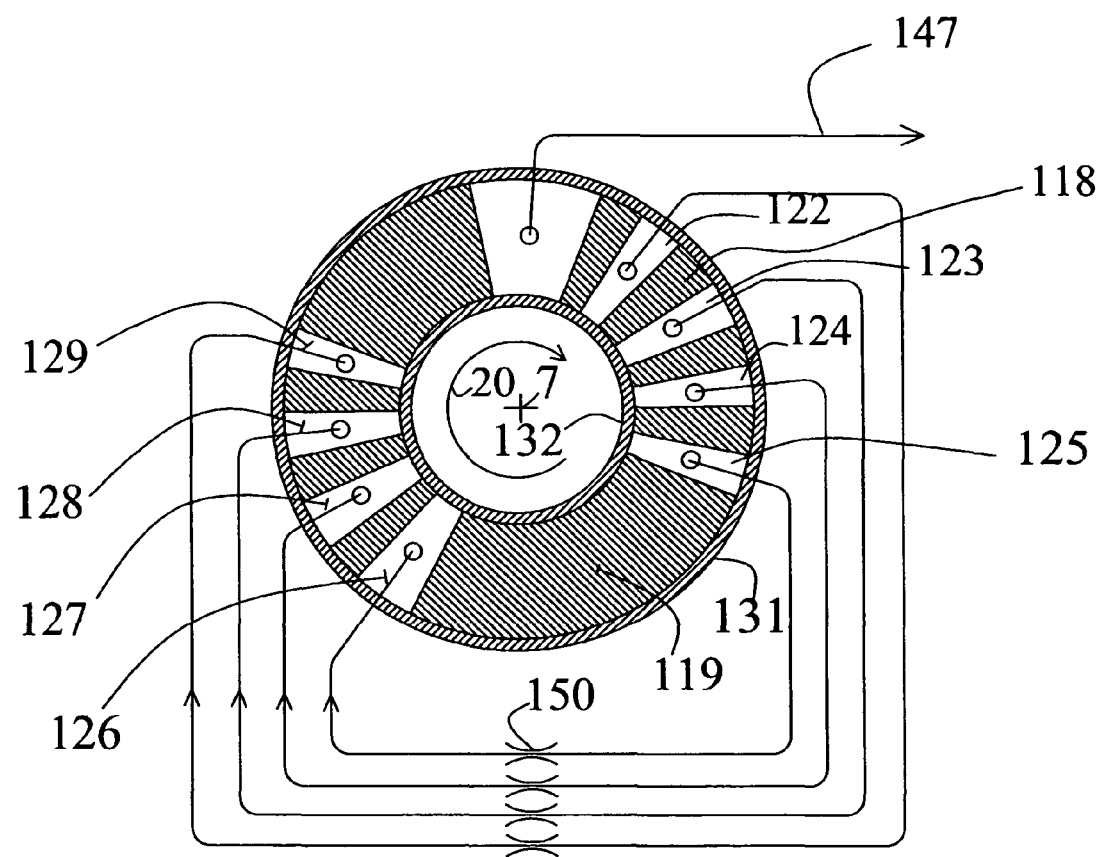

FIGS. 5A and 5B shows the second stator valve face, at section 16'-17' of FIG. 1. Open ports of the valve face are second valve function ports communicating directly to a light product delivery compartment 121; a number of light reflux exit compartments 122, 123, 124 and 125; and the same number of light reflux return compartments 126, 127, 128 and 129 within the second stator. The second valve function ports are in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 140 is shown in FIGS. 1 and 5A to provide pressure let-down of four light reflux stages with energy recovery. The light reflux expander provides pressure let-down for each of four light reflux stages, respectively between light reflux exit and return compartments 122 and 129, 123 and 128, 124 and 127, and 125 and 126 as illustrated. The light reflux expander 140 may power a light product booster compressor 145 by drive shaft 146, which delivers the oxygen enriched light product to oxygen delivery conduit 147 and compressed to a delivery pressure above the highest pressure of the PSA cycle.

Light reflux expander 140 is coupled to a light product pressure booster compressor 145 by drive shaft 146. Compressor 145 receives the light product from compartment 121, and delivers light product (compressed to a delivery pressure above the highest pressure of the PSA cycle) to delivery conduit 147. Since the light reflux and light product have approximately the same purity, expander 140 and light product compressor 145 may be hermetically enclosed in a single housing which may conveniently be integrated with the second stator as shown in FIG. 1. This configuration of a "turbo-compressor" light product booster without a separate drive motor is advantageous, as a useful pressure boost of the light product can be achieved without an external motor and corresponding shaft seals, and can also be very compact when designed to operate at very high shaft speeds.

FIG. 5B shows the simpler alternative of using a throttle orifice 150 as the pressure letdown means for each of the light reflux stages.

Turning back to FIG. 1, compressed feed gas is supplied to compartment 113 as indicated by arrow 125, while heavy product is exhausted from compartment 117 as indicated by arrow 126. The rotor is supported by bearing 160 with shaft seal 161 on rotor drive shaft 162 in the first stator 8, which is integrally assembled with the first and second valve stators. The adsorber rotor is driven by motor 163 as rotor drive means.

A buffer seal 170 is provided to provide more positive sealing of a buffer chamber 171 between seals 131 and 171. The buffer seal 170 substantially prevents leakage across outer circumferential seal 131 on the second valve face 11 that may compromise light product purity, and more importantly may allow ingress of humidity into the second ends of the adsorbers which could deactivate the nitrogen-selective or CO-selective adsorbent. Even though the working pressure in some zones of the second valve face may be subatmospheric (in the case that a vacuum pump is used as exhauster 103), buffer chamber 171 is filled with dry light product gas at a buffer pressure positively above ambient pressure. Hence, minor leakage of light product outward may take place, but humid feed gas may not leak into the buffer chamber. In order to further minimize leakage and to reduce seal frictional torque, buffer seal 171 seals on a sealing face 172 at a much smaller diameter than the diameter of circumferential seal 131. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. A stator housing member 180 is provided as structural connection between first valve stator 8 and second valve stator 9. Direct porting of adsorbers to the stator face is an alternative to providing such seals and is described in commonly-owned, co-pending U.S. Provisional Application No. 60/301,723, filed Jun. 28, 2001, and incorporated herein by reference.

In the following FIGS. 6-13, simplified diagrams will represent a PSA apparatus or module. These highly simplified diagrams will indicate just a single feed conduit 181 to, and a single heavy product conduit 182 from, the first valve face 10; and the light product delivery conduit 147 and a single representative light reflux stage 184 with pressure let-down means communicating to the second valve face 11. The fuel cells referred to in FIGS. 6-13 are polymer electrolyte membrane (PEM) fuel cells, but the systems disclosed are useful with any type of fuel cell such as, for example, a solid oxide fuel cell, or a molten carbonate fuel cell. The disclosed systems and process are particularly useful for PEM fuel cell systems for which oxygen enrichment is especially desirable. However, in certain fuel cell systems oxygen enrichment may not be present since air may be introduced directly into the fuel cell. Thus, the oxygen enrichment PSA modules depicted in the representative systems shown in FIGS. 6-13 are optional.

FIG. 6

Figure 6A:
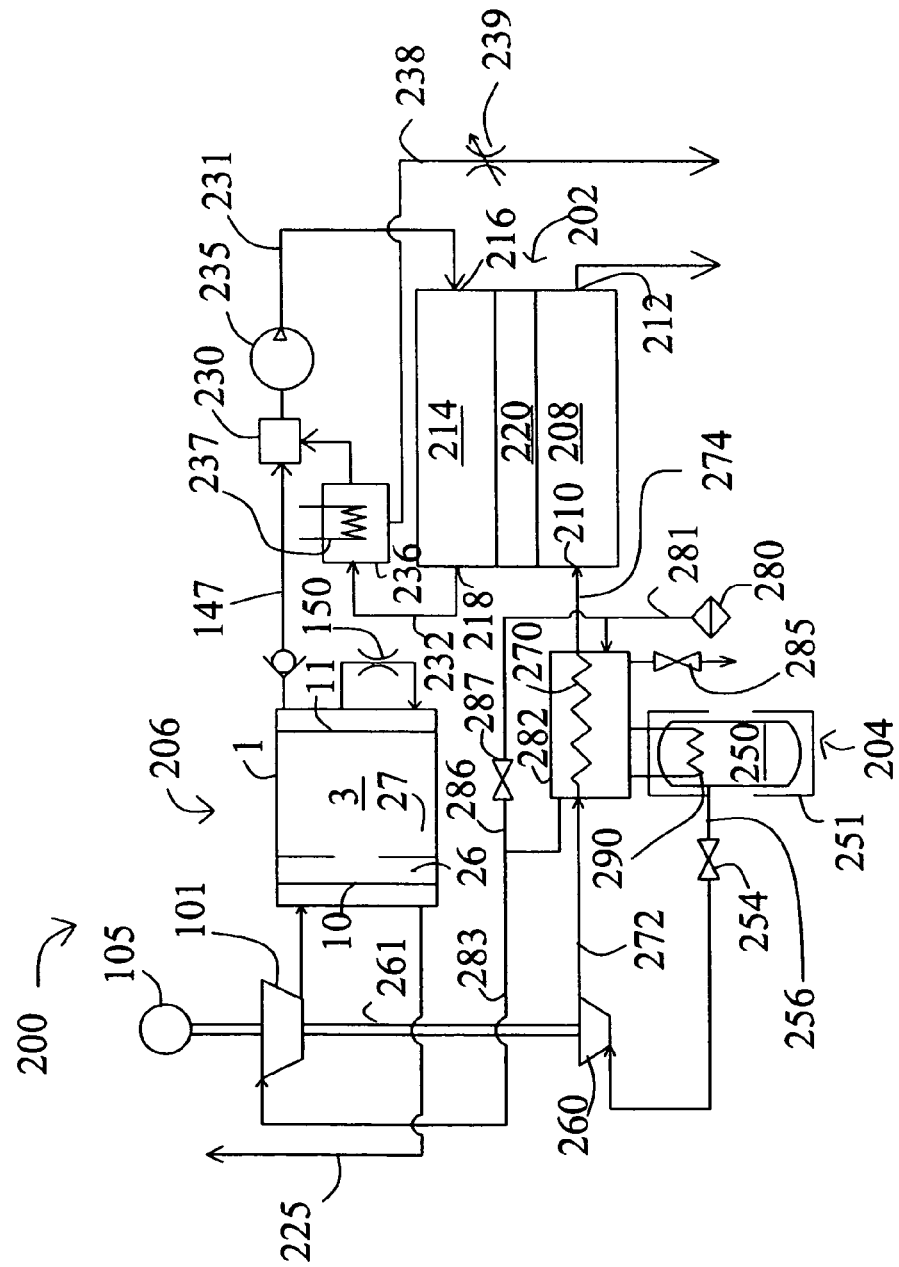
FIGS. 6A and 6B are simplified schematics of PEM fuel cell power plants with a PSA unit for oxygen enrichment, with feed air refrigeration and optional mechanical energy recovery from the hydrogen storage system.
Figure 6B:
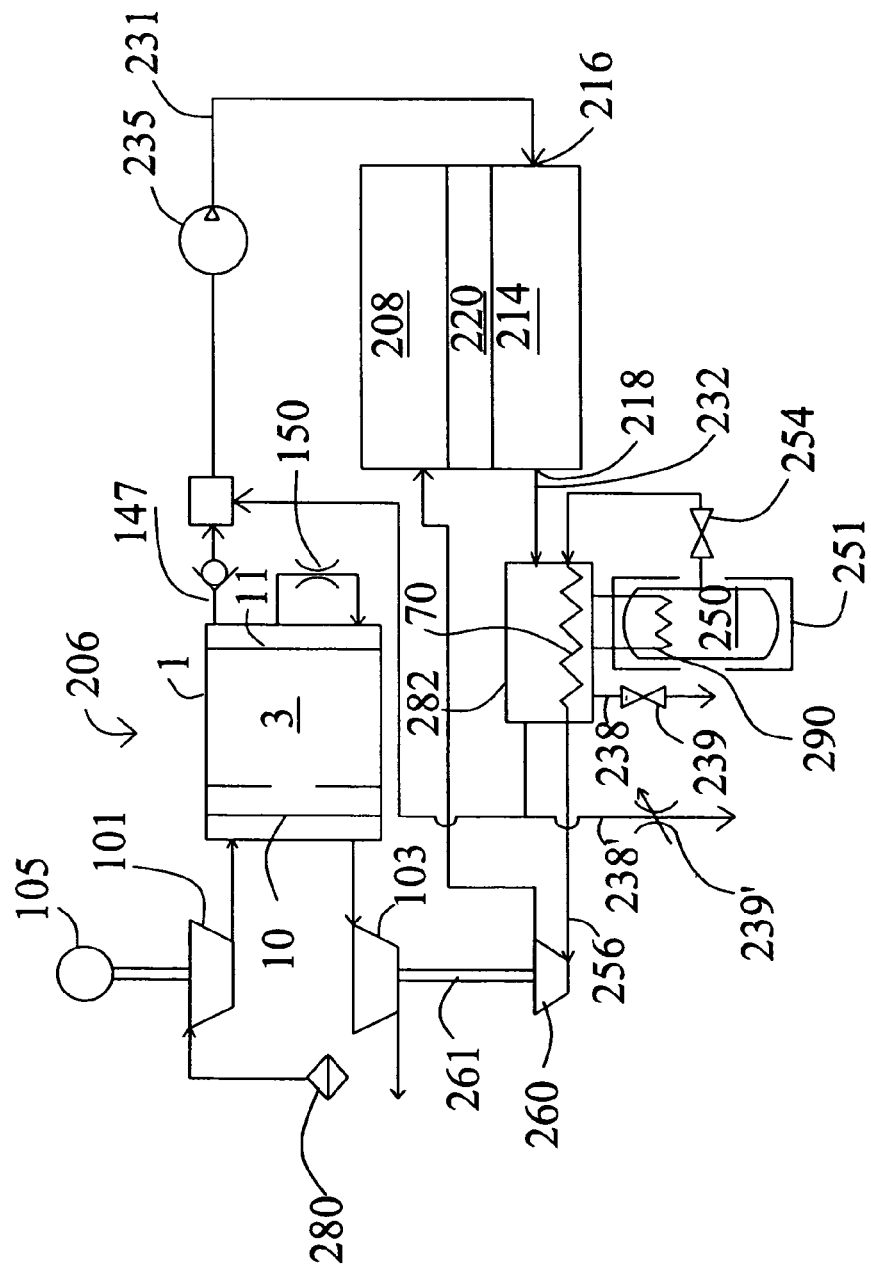

FIGS. 6A and 6B show a representative fuel cell power plant 200 that includes a fuel cell 202, a hydrogen storage system 204, and an oxygen enrichment PSA or VPSA system 206. According to a particular representative embodiment, the fuel cell comprises an anode channel 208 including an anode gas inlet 210 and optionally an anode gas outlet 212, a cathode channel 214 including a cathode gas inlet 216 and a cathode gas outlet 218, and a PEM electrolyte membrane 220 in communication with the anode channel 208 and the cathode channel 214 for facilitating ion exchange between the anode channel 208 and the cathode channel 214.

Figure 8:
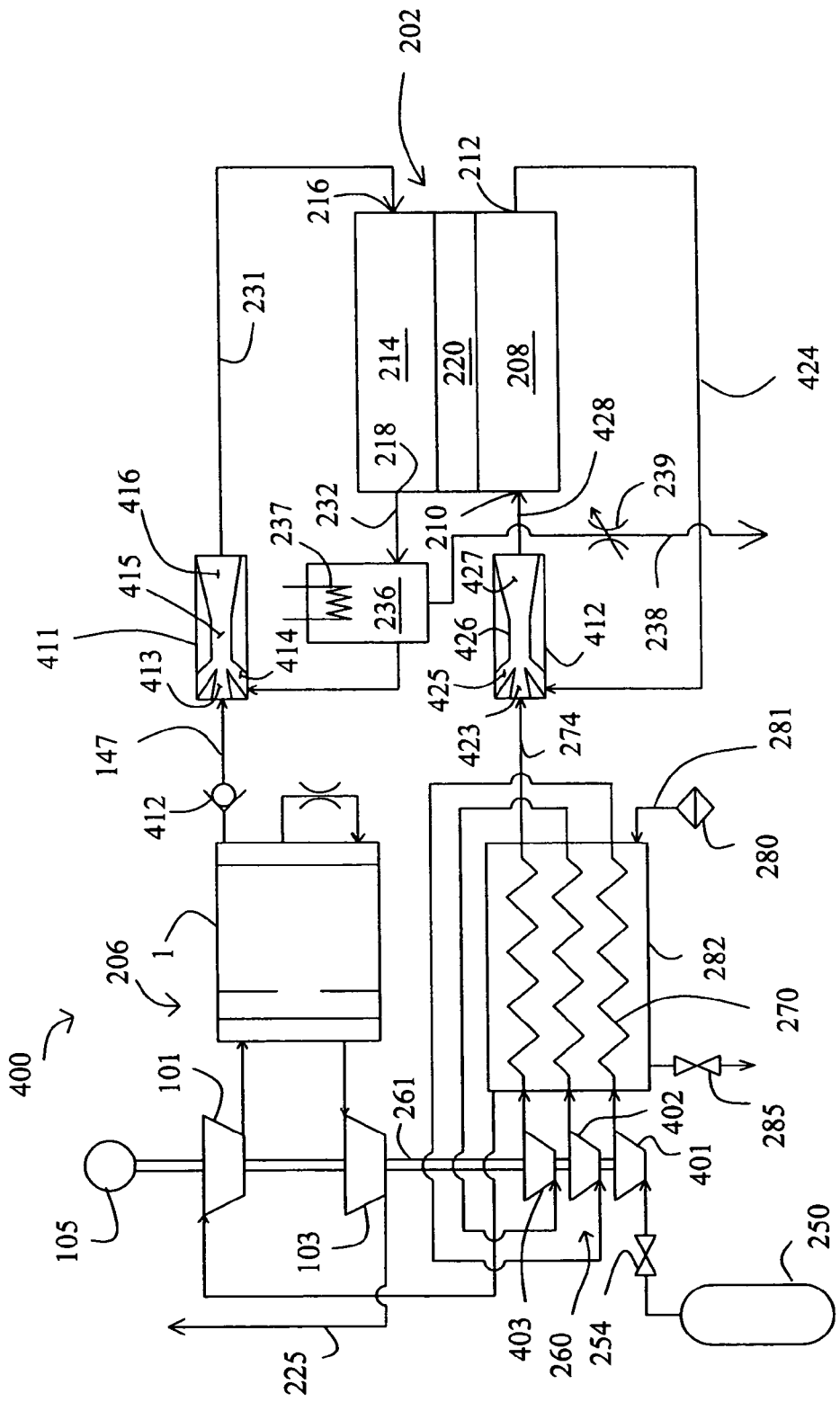
FIGS. 8 to 10 are simplified schematics of PEM fuel cell power plants with a PSA or VPSA unit for oxygen enrichment.

The oxygen enrichment system 206 extracts oxygen gas from feed air, and comprises a PSA rotary module 1 and a compressor 101 for delivering pressurized feed air to the feed compartments of the PSA rotary module 1. If configured as a VPSA system, the oxygen enrichment system 206 would include a vacuum pump 103 (as shown in FIG. 8), which may be coupled to the compressor 101, for withdrawing nitrogen-enriched gas as heavy product gas from the blowdown and exhaust compartments of the PSA rotary module 1, and discharging the nitrogen enriched gas from conduit 225. Dry oxygen-enriched air as the light product gas of PSA module 1 is delivered by conduit 147 to humidification chamber 230, and thence by conduit 231 to cathode inlet 216. A portion of the oxygen reacts with hydrogen ions to form water in the cathode, and the remaining cathode gas containing this product water is withdrawn from cathode exit 218. In order to achieve satisfactory fuel cell water management, a portion of the product water may be optionally mixed back into the cathode gas, most conveniently by recirculating all or part of the cathode gas from exit 218 by conduit 232 back to humidification chamber 230. A boost pump 235 may be provided in conduit 231 to drive the recirculation flow of the cathode exhaust gas. Excess water and cathode exhaust gas may be removed from conduit 232 by a water separator 236 with cooler 237 and a discharge conduit 238 with control valve 239. According to particular embodiments, the humidification chamber 230 may be integrated with the separator 236, with cathode purge removed by conduit 238 directly from conduit 232. Water condensate and excess cathode gas to be purged may be removed by separate discharge conduits.

Hydrogen storage system 204 includes a hydrogen storage vessel 250. Hydrogen storage vessel 250 may be a simple pressure vessel for compressed hydrogen, operating to pressures as high as 700 bars absolute. Alternatively, hydrogen storage vessel 250 may be a pressure vessel container for a bed of a hydrogen sorbent. Illustrative hydrogen sorbents include (for the embodiment of FIG. 6B) hydride-forming metal or metal alloys such as FeTi, LaNi$_5$ or Mg$_2$Ni; and physical adsorbents including zeolites or carbon adsorbents such as activated carbon, carbon powder, amorphous carbon, carbon fibers, carbon nanofibers, carbon nanotubes, and similar graphite materials as described, for example, in PCT Application Publication No. WO 00/75559. Further illustrative hydrogen storage systems include sodium borohydride and calcium borohydride that release compressed hydrogen upon contact with water. According to a further variant, hydrogen storage vessel 250 may be a dewar with an insulation jacket 251 for containing liquid hydrogen at a temperature of about 20 K. Alternatively, hydrogen may be adsorbed in a cryogenic adsorbent bed, such as a bed of activated carbon or a zeolite adsorbent, at a temperature in the approximate range of 77K to ambient.

Hydrogen fuel is released from hydrogen storage vessel 250 by valve 254 or a flow metering device as fuel flow control means (and thus as the fuel release mechanism) into conduit 256, and thence to a hydrogen energy-recovery expander 260. Hydrogen expander 260 is mechanically coupled to compressor 101 in FIG. 6A or to vacuum pump 103 in FIG. 6B via schematically depicted shaft 261. Thus, hydrogen expander 260 assists in powering compressor 101. If the compressor 101 is a two-stage compressor, one stage might be powered by shaft 261 and the other stage by motor 105. Although not shown in FIG. 6, hydrogen expander 260 could be coupled to other devices requiring mechanical power such as, for example, a vacuum pump, rotary bed or rotary valve for the PSA module 1 or to external power loads such as vehicle propulsion or air conditioning.

In general, the hydrogen may be released by the fuel flow control means at an elevated pressure (e.g., about 700 to about 10 bars absolute) relative to the fuel cell hydrogen working pressure (e.g., about 1 to about 10 bars absolute). The hydrogen may also be released at a sub-ambient temperature corresponding to the storage temperature. Expander 260 lets down or reduces the pressure of the hydrogen in one or more stages, to substantially the working pressure of the fuel cell anode inlet.

The expansion occurring in the expander 260 cools the hydrogen. In the embodiment depicted in FIG. 6A the cooled hydrogen may be warmed by heat exchange with feed air in a heat exchange coil 270 fluidly communicating with expander 260 by conduit 272 and with the anode inlet 210 by conduit 274. Feed air to compressor 101 is introduced via inlet filter 280 and infeed conduit 281 to heat exchange condenser 282 enclosing the heat exchange coil 270, and is countercurrently cooled against the hydrogen being warmed within the coil, before being supplied to compressor 101 by conduit 283. Atmospheric humidity is partially condensed, and is removed from the condenser 282 by drain valve 285. Alternatively, the condensed atmospheric humidity could be introduced to the humidification chamber 230. The cooled and dried air is then conveyed by conduit 283 from condenser 282 to compressor 101. The arrangement of the heat exchanger condenser 282 and the heat exchange coil 270 is simply an illustrative example and alternative heat exchange arrangements could be employed. For example, it may be necessary to avoid frost build-up on coil 270 in winter conditions or it may be desirable to allow the fuel cell system to heat up as quickly as possible when the starting temperature is near or below 0° C. In these cases, a conduit 286 with valve 287 bypassing the heat exchanger condenser 282 may be provided so that conduit 281 may be connected directly to conduit 283 and the inlet of compressor 101 in cold weather conditions. According to further variations of the embodiment shown in FIG. 6A, the hydrogen entering the heat exchange condenser 282 could be used to cool other fluid streams or components of the system in addition to, or instead of, the inlet air stream. For example, possible cooling opportunities exist for cathode recycle gas in conduit 232, other fuel cell reactants, or fuel cell components such as heat exchangers associated with a fuel cell coolant loop.

A heat exchanger 290 is shown in communication between storage vessel 250 and condenser 282 to illustrate recovery of refrigeration from release of hydrogen stored under cryogenic conditions, or stored in an adsorbent such as activated carbon at sufficiently low temperatures so that a useful cooling effect may be obtained from the endothermic heat of desorption. Heat exchanger 290 may represent conductive metal fins or rods extending from the interior of vessel 250 to heat exchange condenser 282, or may represent heat exchange coils containing any heat exchange fluid circulated by free or forced convection, e.g., by an auxiliary pump. According to certain embodiments, heat exchanger 290 may be a loop of heat exchange coil 270 extending into vessel 250, so that already at least partly warmed hydrogen fuel is used as the heat exchange fluid. Isolation valves (not shown) may be provided for heat exchanger 290 at its penetrations through vessel 250, with these isolation valves opened when fuel is being delivered, and closed when fuel is not being delivered so as to prevent heat exchange circulation when the power plant is shut down.

FIG. 6B shows a related embodiment, in which fuel cell waste heat is used to release the hydrogen fuel from storage vessel 250, and to warm the hydrogen in conduit 256 prior to its expansion across energy-recovery expander 260. Expander 260 thus achieves energy recovery from both the fuel cell waste heat and from the release of hydrogen from the fuel storage system. Cathode gas from cathode exit port 218 is circulated by conduit 232 to the heat exchanger condenser 282, from which excess water condensate is released by water discharge valve 239 in conduit 238. Excess cathode gas (concentrated in nitrogen and argon after consumption of oxygen in the fuel cell cathode) is purged by gas discharge valve 239' in conduit 238'. Heat is transferred from the cathode gas to the hydrogen in conduit 256 via heat exchanger 290.

The embodiment depicted in FIG. 6B recovers heat from cathode exhaust gas being withdrawn (and in part recirculated) from the fuel cell cathode. The operating temperature of low temperature fuel cells (e.g. PEM fuel cells) is typically at least 60° C. and may be about 100° C. This is a convenient temperature for desorbing hydrogen from metal hydrides such as FeTi (which holds about 1.9% hydrogen by weight at a hydrogen pressure of about 5.2 bars at 30° C.) or LaNi$_5$ (which holds about 1.4% hydrogen by weight at a hydrogen pressure of about 4 bars at 50° C.). By heating the metal hydride through heat exchanger 290 to a temperature approaching the working temperature of the fuel cell, hydrogen may readily be released into conduit 256 at an elevated pressure in the range of about 4 to about 20 bars, thus providing driving pressure for energy-recovery expander 260.

The operating temperature of high temperature fuel cells (e.g. SOFC fuel cells) is typically at least 600° C. and may be about 1000° C. Magnesium based hydrides have exceptionally high hydrogen capacity and are particularly suitable when high grade waste heat is available as from a SOFC fuel cell. For example, Mg$_2$Ni holds about 3.6% hydrogen by weight at a hydrogen pressure of about 2.5 bars at 300° C. By heating such metal hydrides through heat exchanger means 290 to about 350° C., a usefully elevated inlet pressure in the range of about 10 to about 20 bars may be provided to energy recovery expander 260.

While heat recovery from the fuel cell cathode loop has been depicted in FIG. 6B, it will be appreciated that waste heat may be recovered to a heat exchange condenser 282 from an anode gas recirculation loop or from any other heat source (such as an anode tail gas combustor) in the fuel cell system.

In the case of cryogenic storage of liquid hydrogen, a refrigeration effect may be obtained by vaporization and then by warming up of the hydrogen at substantially ambient pressure. The cryogenic liquid hydrogen may be warmed, and thus vaporized, via heat transfer from the heat exchanger 290 to the cooler cryogenic liquid hydrogen. This refrigeration effect is used in heat exchanger 290 to chill the feed air in countercurrent heat exchange with the hydrogen being warmed. A greater refrigeration effect plus recovered mechanical energy may be obtained by pumping the liquid hydrogen to an elevated substantially supercritical pressure (e.g. 100 or 200 bars) and then warming up the hydrogen via heat exchanger 290 prior to several stages of expansion in expander 260.

An even greater refrigeration effect plus recovered mechanical energy may be achieved by providing the heat to warm up the hydrogen as heat of compression rejected by a multistage Stirling engine (or an engine using a similar regenerative thermodynamic cycle to the Stirling cycle). The expansion portion of the Stirling engine cycle also could absorb heat from the feed air, thus chilling the feed air prior to its introduction into an oxygen PSA system. The heat taken up by the Stirling cycle to chill the feed air is much greater than the heat rejected at low temperature by the same Stirling cycle to warm the hydrogen. In these examples, the useful refrigeration effect (to chill feed air to the PSA unit) is greatly enhanced by the recovery of mechanical energy to help drive the PSA compressor and/or vacuum pump. An example of a system that includes a Stirling engine is described below in more detail in connection with FIG. 11.

Chilling the feed air to the PSA unit also reduces power demand of the PSA feed air compressor by reducing the volume of air to be compressed, both by reducing the temperature of the feed air and by reducing the mole fraction of water vapor. Systems with multistage feed air compression (as detailed below) may employ intercooling between the stages for reducing frost formation without foregoing the benefit of reducing the volume of feed air to the compressor. Power demand of the PSA unit may be further reduced by chilling to an optimum temperature for achieving high fractional yield of oxygen from the feed air, thus again reducing the volume of feed to be compressed and the volume of exhaust flow for vacuum pumping. For example, the temperature of the feed air introduced into the oxygen enrichment system 206 may be reduced to a temperature of about 0 to about 110° C. at the compressor 101 inlet at summer conditions. In winter conditions, this chilling step would be bypassed, so the PSA system would operate under approximately similar inlet temperature conditions during all seasons.

The embodiment depicted in FIG. 6 depicts a system for capturing additional hydrogen storage energy from the cooling effect that occurs in each stage of expansion in expander 260 when the hydrogen is cooled by approximately ideal isentropic expansion. However, such additional energy recovery may not be necessary in all systems. Thus, the hydrogen exiting the expander 260 may be introduced directly into the anode gas inlet 210 without first passing through the heat exchange coil 270.

Optionally, a PSA module (not shown) may be located between the expander 260 and/or heat exchange condenser 282 for purifying or enriching the hydrogen gas entering the anode gas inlet 210. Illustrative hydrogen-enriching PSA modules are described, for example, in commonly-assigned, copending U.S. patent application filed Oct. 26, 2001, for "Systems and Process for Providing Hydrogen to Fuel Cells."

FIG. 7

Figure 7:
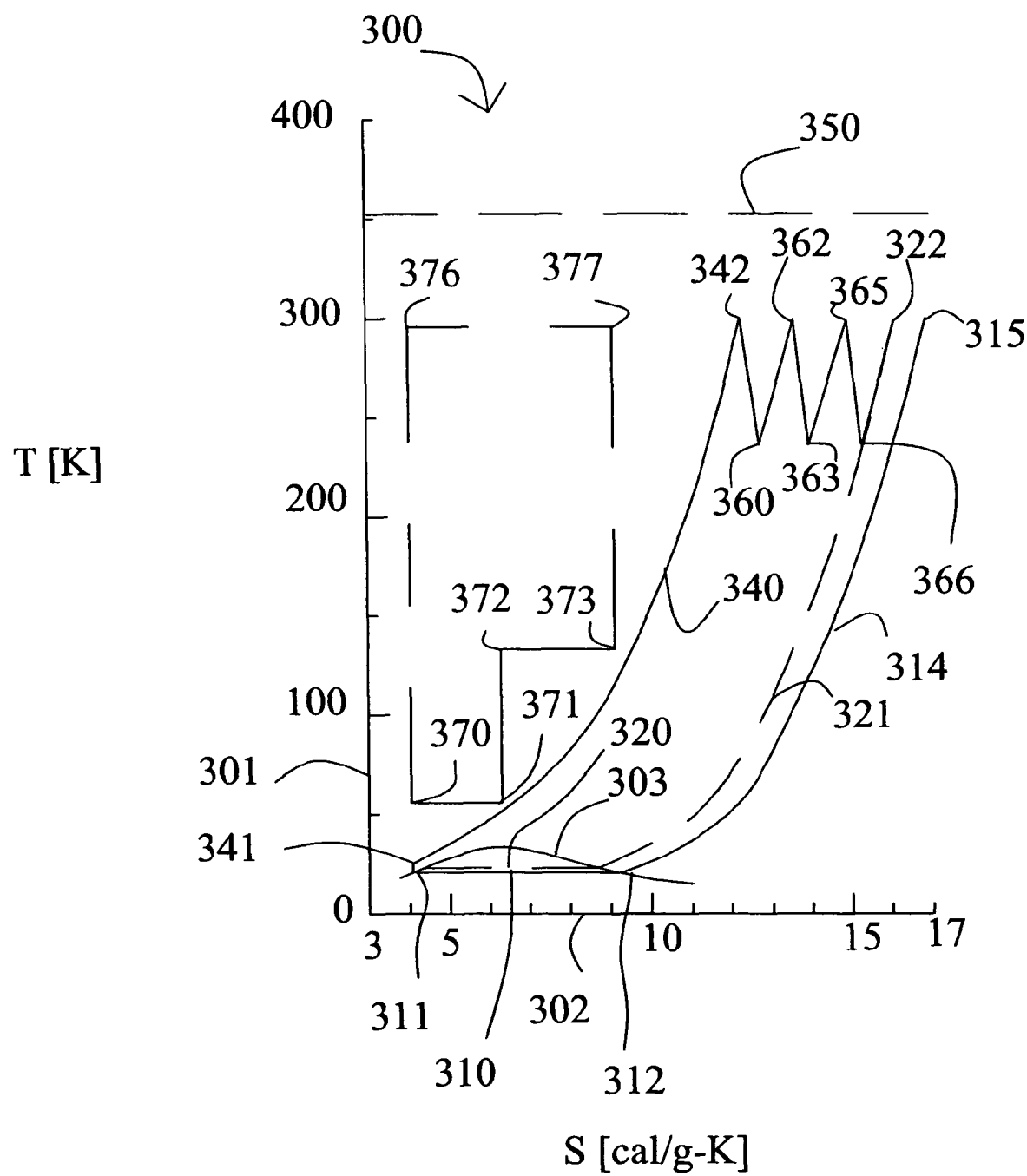
FIG. 7 is a T-S diagram for hydrogen, showing direct expansion and two stage Stirling cycle energy recovery options.

FIG. 7 shows a temperature-entropy diagram 300 for one gram of hydrogen under compressed and/or cryogenic storage conditions as provided in Perry and Chilton, "Chemical Engineers' Handbook" (McGraw-Hill). The ordinate 301 is absolute temperature, and the abscissa 302 is entropy. The phase change between vapor and liquid is denoted by phase boundary curve 303. Below the phase boundary curve, the one atmosphere isobar 310 for mixed liquid and vapor is indicated by a solid line extending from liquid 311 to vapor 312 on phase boundary curve 303.

In the gas phase, the one atmosphere isobar 314 is shown extending from vapour point 312 to point 315 at a nominal ambient temperature of 25° C. Similarly, the isobar for 2 bars pressure is shown as a dashed line 320 in the mixed phase zone and as a dashed curve 321 for gas up to point 322 at 25° C. A supercritical isobar 340 for a pressure of 100 bars is shown extending from point 341 (reached by isentropic compression of liquid from point 311) to point 342 at 25° C. A dashed line 350 indicates the typical 80° C. working temperature of a PEM fuel cell.

Point 342 (100 bars, 25° C.) indicates a typical starting point for energy recovery from hydrogen stored as compressed gas. Since typical compressed hydrogen refueling pressure would be much higher, e.g. at least 200 bars and with current composite pressure vessels up to about 700 bars absolute at fully charged pressure, this starting point actually corresponds to energy recovery from a hydrogen storage tank which is at least half discharged from its "full" condition. Expansion energy recovery is achieved in this example by three stages of expansion, a first stage from point 342 to point 360, a second stage from point 362 to point 363, and a third stage from point 365 to point 366—and with each stage of expansion over a similar pressure ratio so that each stage recovers a similar amount of mechanical energy and provides a similar temperature reduction to the other stages. In this instance, the hydrogen is re-heated for each expansion (e.g., from point 360 to point 362, from point 363 to point 365, etc.) by coils 270 shown in FIG. 8. Assuming that expansion of the first stage starts from 100 bars pressure, and expansion of the third stage concludes at 2 bars pressure as the working pressure of the fuel cell the total pressure ratio of the three-stage expansion is 50. Hence, the pressure ratio of each expansion stage may be the cube root of 50, or approximately 3.8.

With typical efficiency of the expansion stages, each stage of expansion will cool the hydrogen by approximately 65 K. That cooling effect will be transferred in a heat exchanger coil 270 to refrigerate the feed air as the hydrogen is reheated for the next stage of expansion or finally for the fuel cell. Assuming a 15 K approach in heat exchange, about 50 K of reheating the hydrogen will be available for cooling the feed air. Low humidity air passing through condenser 282 should be cooled by about 30 K since the molar flow of feed air will typically be about 5 times the molar feed flow of the fuel hydrogen (assuming 60% fractional recovery of oxygen by the PSA from the feed air, 80% utilization of the enriched oxygen by the fuel cell, and 100% utilization of the hydrogen by the fuel cell) and the cooling effect is provided three times. The temperature reduction would, of course, be less for high humidity air, owing to reduction of the sensible heat available for temperature reduction by the latent heat of water being condensed.

In the alternative case that hydrogen is stored as cryogenic liquid at about 20K, the starting point for "direct expansion cycle" energy recovery would be pumping the liquid hydrogen from point 311 (one bar pressure) to point 341 (e.g. 100 bars pressure). The hydrogen is then warmed along supercritical isobar 340 from point 341 to point 342 at approaching ambient temperature, from which energy recovery expansion may take place in three stages (points 342-360, 362-363, 365-366) exactly as discussed above.

FIG. 7 also shows the opportunity for complementing the direct expansion cycle with further energy recovery by a regenerative thermodynamic cycle such as the Stirling cycle. A two stage Stirling cycle will be described in FIG. 11 below. The idealized T-S diagram of a two stage Stirling cycle includes heat rejection by the Stirling engine at a lower temperature (e.g., about 50 K to about 60 K) along the line between points 370 and 371, heat rejection by the Stirling engine at an intermediate temperature (e.g. between about 100 K and about 150 K) between points 372 and 373, and heat uptake or cooling by the Stirling engine at an upper temperature (e.g., about 300 K to about 360 K) of between points 376 and 377. The upper temperature may be seasonably variable and somewhat below ambient as when cooling feed air to the PSA unit and condensing humidity from that feed air. Alternatively, the upper temperature could be substantially the working temperature of the fuel cell stack, so that waste heat from the fuel cell may be recovered either directly by cooling the stack 202 or indirectly from heat exchanger 237 on the cathode exhaust gas. While PEM fuel cells operate in the approximate range of about 80° C. to about 100° C., higher temperature fuel cells (e.g. solid oxide fuel cells) operate at very high temperatures in the range of about 600° C. to about 1000° C. so that high grade stack waste heat is generated. The thermodynamic efficiency of energy recovery from fuel cell stack waste heat is greatly enhanced when heat can be rejected at a cryogenic temperature as provided in the presently described systems. In such embodiments energy recovery from cryogenic hydrogen storage is synergistically combined with energy recovery from fuel cell stack waste heat.

The area enclosed by points 370, 371, 372, 373, 377, 376 and back to point 370 indicates the theoretical work which could be extracted (expressed as calories of equivalent work per gram of hydrogen released as fuel) by an ideal two stage Stirling cycle of perfect efficiency. The energy availability or energy for ideally efficient release of hydrogen, to ambient pressure and temperature from liquid hydrogen storage, is given by the area on the T-S diagram enclosed by points 311, 312, 315, 376 and back to point 311, above the one atmosphere isobar 314.

FIGS. 8-10

Figure 9A:
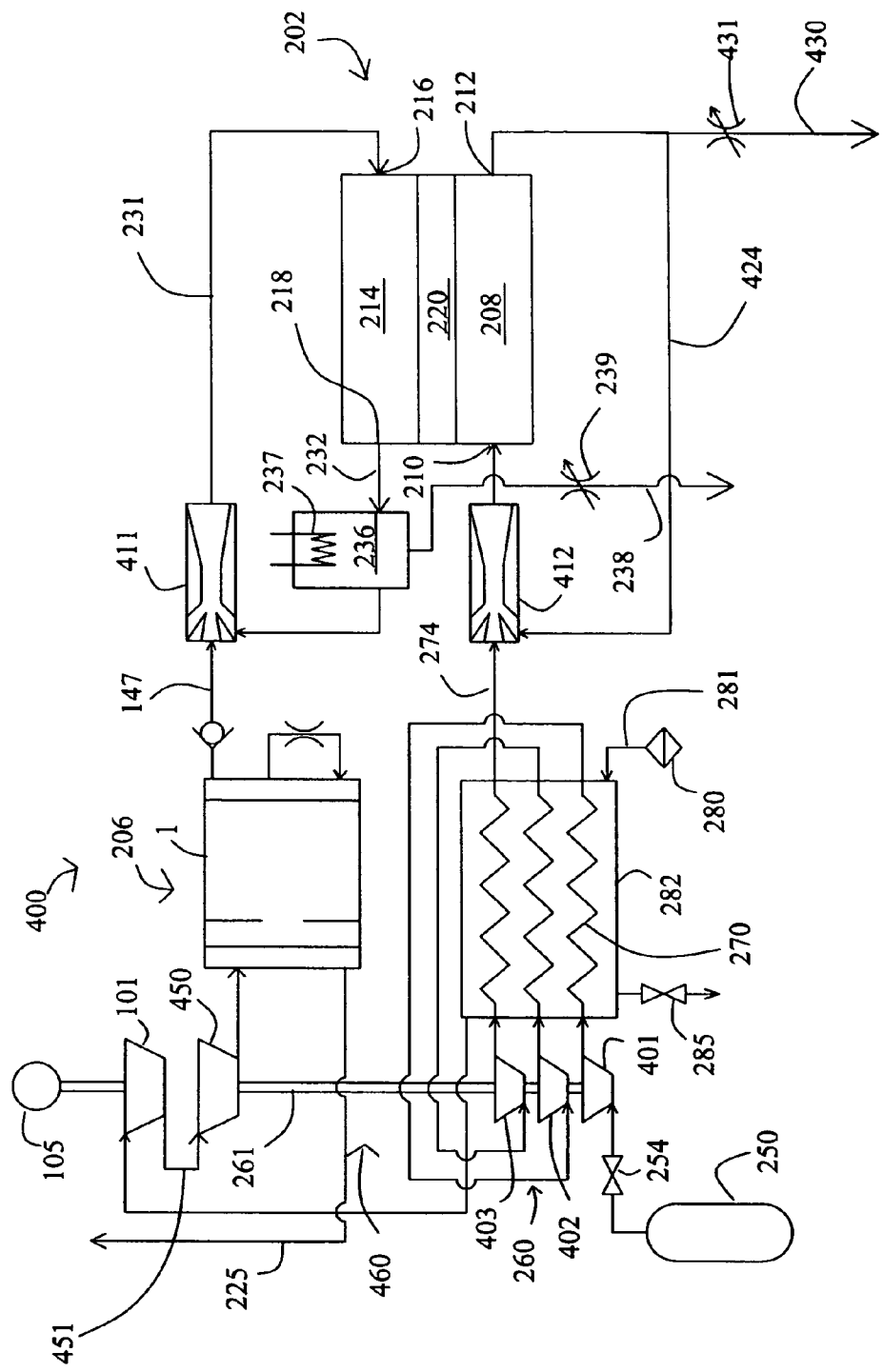
Figure 9B:
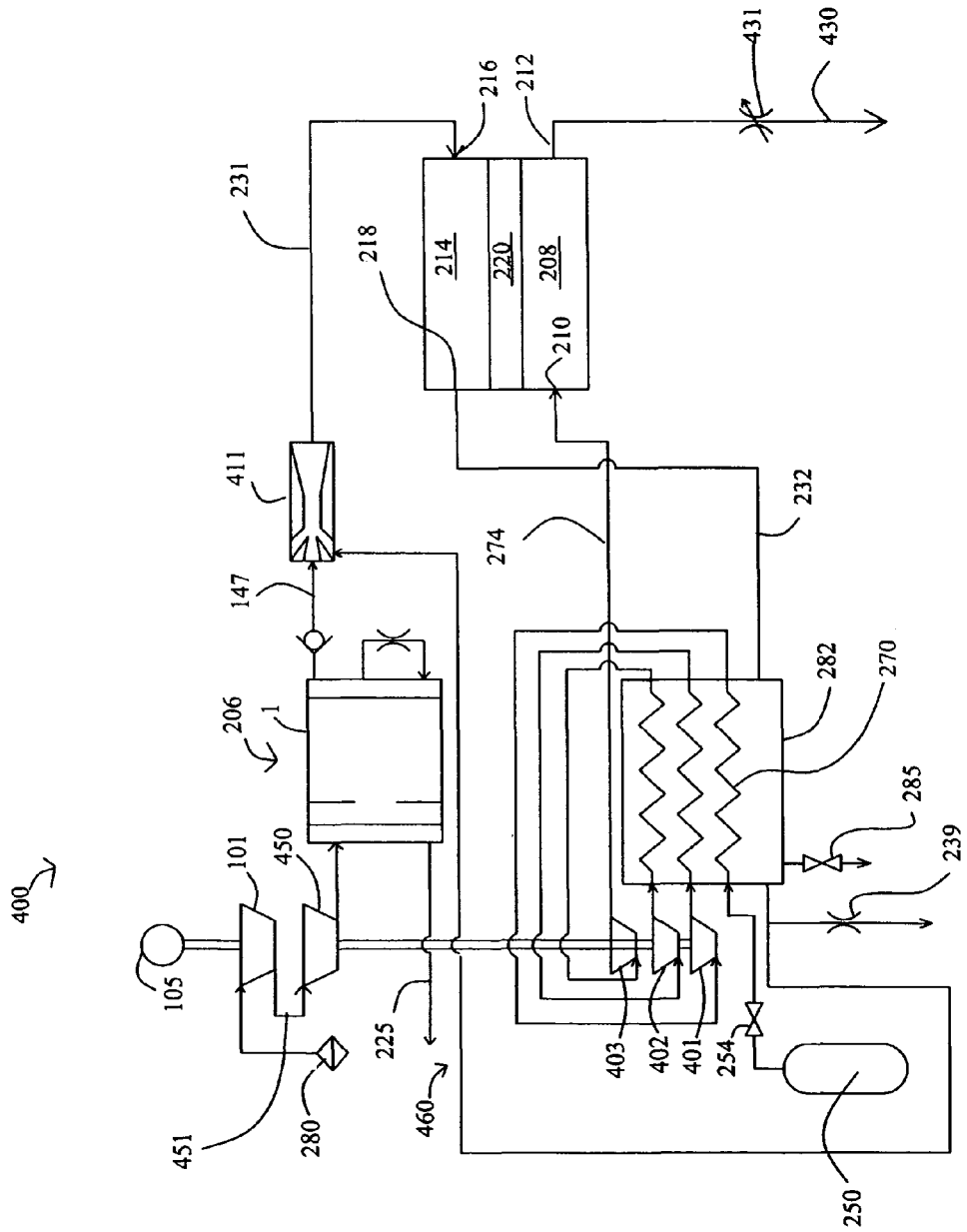
Figure 10:
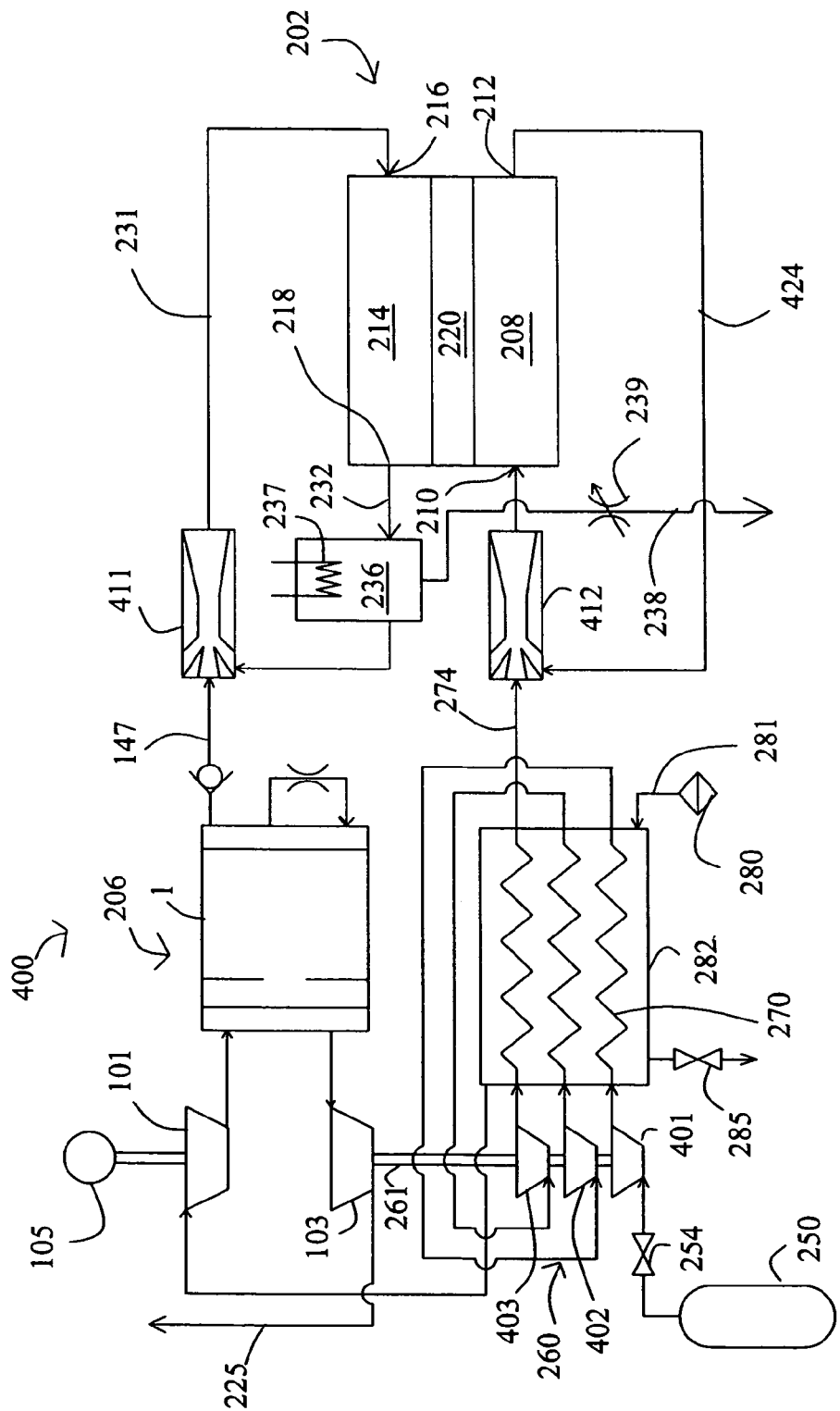

FIGS. 8-10 are schematics of a representative fuel cell power plant 400 with compressed hydrogen storage in high pressure vessel 250. According to the examples shown in FIGS. 8-10, expander 260 is provided as three expander stages 401, 402 and 403, each delivering hydrogen gas that has been cooled by approximately isentropic expansion into a heat exchange coil 270. However, expander 260 may include any suitable number of stages such as, for example, two stages or four stages. Separate heat exchange coils may be provided to each expander stage or the streams from each expander stage may be combined and introduced into a single heat exchange coil. The hydrogen is warmed in the heat exchange coils 270 by heat exchange with feed air in condenser 282, so that the air is cooled and a portion of the atmospheric humidity may be condensed out.

As the pressure in vessel 250 drops with progressive delivery of its contained compressed fuel, the pressure across each expander stage 401, 402, 403 will also drop. Consequently, the availability of energy recovery from the fuel being delivered also declines. If desired, one or more stages 401-403 may be bypassed when the pressure remaining in vessel 250 is significantly reduced. Such by pass avoids an undesirably low pressure ratio across the other expander stages which would then perform the full expansion duty.

FIGS. 8-10 also show optional recirculation devices for the cathode and the anode loops of the fuel cell, provided, respectively, as ejectors 411 and 412. These ejectors or other recirculation blowers assist in maintaining humidity balance in all parts of the cathode and anode flow channels.

Ejector 411 defines a nozzle 413 for receiving oxygen-enriched air from the PSA module 1 via a conduit 147 and a non-return valve 412. Recirculated oxygen-enriched cathode gas is brought by conduit 232 and water separator 236 to an ejector inlet 414. Ejector 414 inlet can be a suction inlet. The combined flow from the nozzle 413 and the suction inlet 414 is mixed in mixing section 415 of the ejector, followed by pressure recovery in diffuser 416 before the flow is brought by conduit 231 to the cathode inlet 216. Similarly, ejector 412 defines a nozzle 423 for receiving hydrogen from the hydrogen storage vessel 250 via a conduit 274. Recirculated anode exhaust gas is brought from the anode channel exit port 212 by conduit or anode gas loop 424 to an ejector inlet 425. Ejector inlet 425 can be a suction inlet. The combined flow from the nozzle 423 and the suction inlet 425 is mixed in mixing section 426 of the ejector, followed by pressure recovery in diffuser 427 before the flow is brought by conduit 428 to the anode inlet 210.

As shown in FIGS. 9A and 9B, a purge line 430 with purge valve 431 may be provided to purge inert components from the anode gas loop 424. Purge may be required during initial startup, and a small level of purge during operation will be required if the feed hydrogen is less than absolutely pure. For higher levels of impurity, a hydrogen PSA unit may be located between the heat exchange condenser 282 and the anode inlet 210 to remove impurity components while minimizing loss of fuel hydrogen. With a system operating on highly pure hydrogen fuel, anode recirculation and anode purging may not be necessary.

In FIG. 8, the oxygen enrichment is performed by VPSA. The three-stage hydrogen storage energy recovery expander is shown schematically coupled by shaft 261 to assist a motor 105 in driving compressor 101 and vacuum pump 103. Of course, compressor 101 and pump 103 could be driven by separate motors, and the energy recovery could be applied to either one of them. For example, FIG. 10 depicts a system wherein the compressor 101 and the vacuum pump 103 are de-coupled from each other. The compressor 101 is powered by motor 105. The vacuum pump 103 is powered by the shaft 261 coupled to the expander 260.

FIGS. 9A and 9B include a PSA system in which the feed air is compressed in two stages, the first stage being compressor 101 powered by electric motor 105, and the second stage being compressor 450 which is powered by expander 260 through shaft 261. Conduit 451 can be configured (not shown) to pass through heat exchange condenser 282 in order to provide an intercooling function between the compression stages. Second stage compressor 450 may be a centrifugal or multistage axial compressor, and expander 260 may be an impulse turbine as described above. Second stage compressor 405 and expander 260 together operate as a free rotor "turbocharger" 460. In FIG. 9A (as in FIGS. 8 and 10) feed air to the oxygen PSA unit 206 is cooled and dehumidified in heat exchange condenser 282. FIG. 9B shows the alternative of fuel cell waste heat from the cathode being recovered in heat exchange condenser 282 similar to FIG. 6B.

Figure 11A:
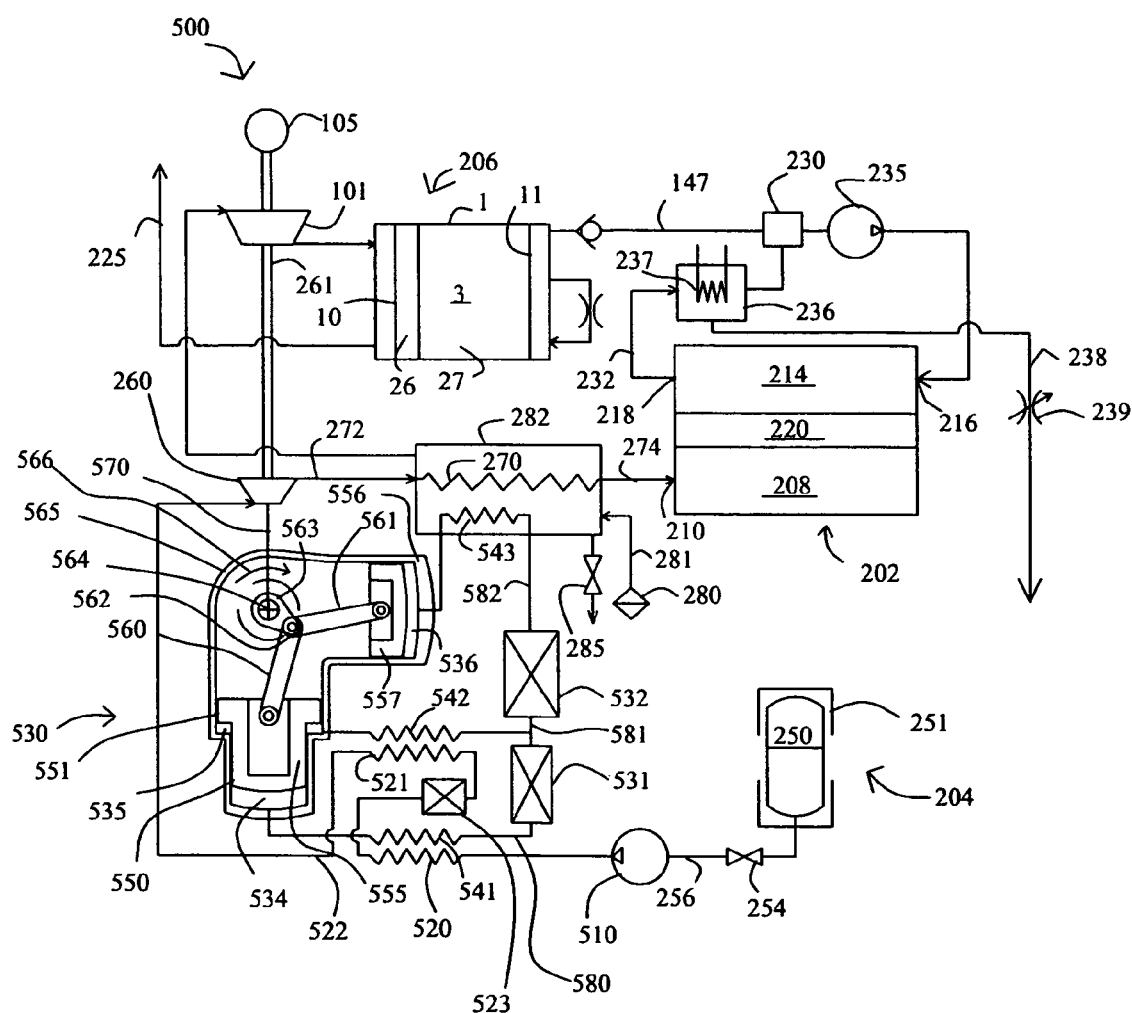
FIGS. 11A and 11B show a combined direct expansion and Stirling cycle system for energy recovery.
Figure 11B:
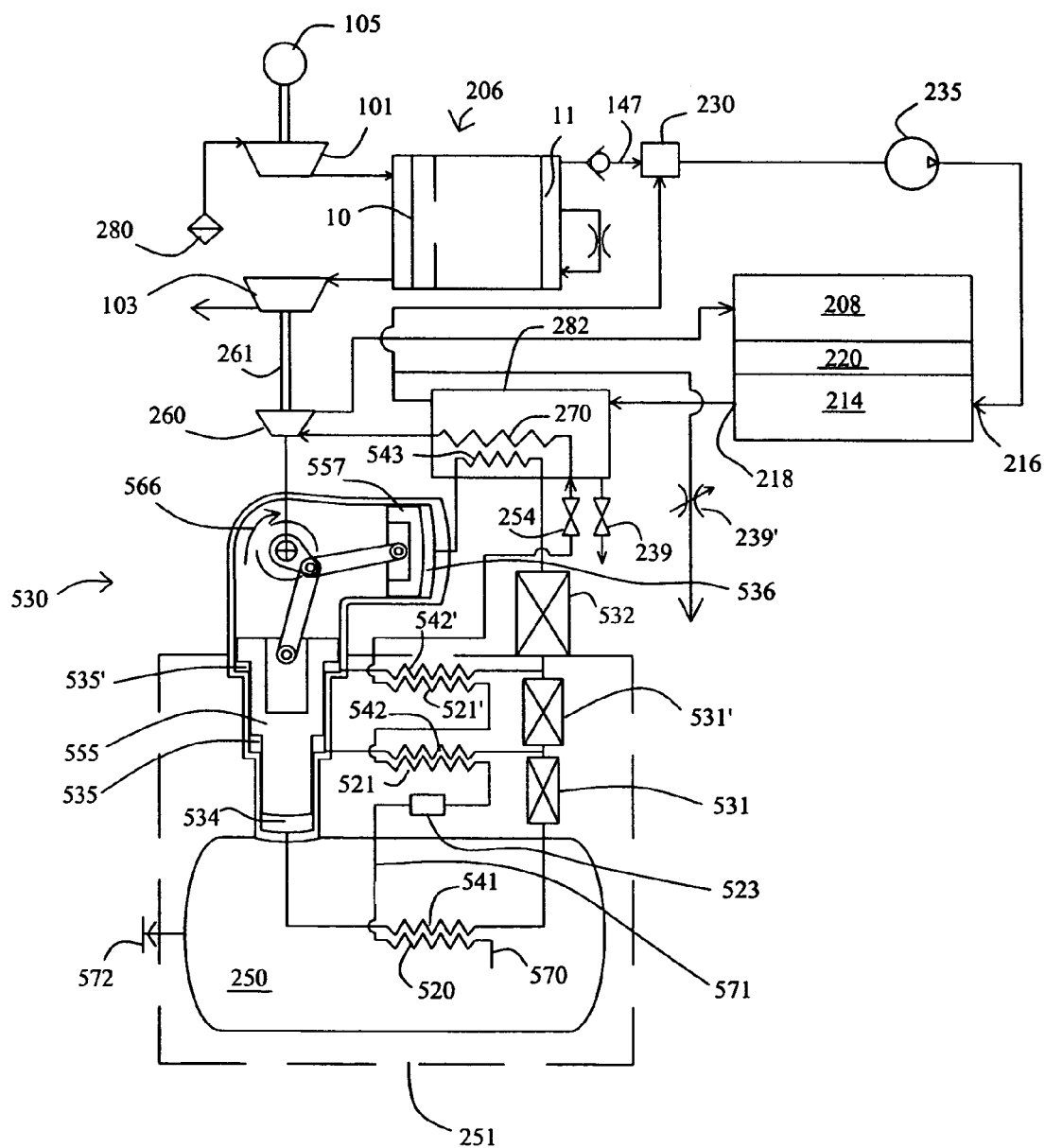

FIGS. 11A and 11B

FIGS. 11A and 11B show another representative fuel cell power plant 500 with liquid hydrogen stored in dewar 250 which has an insulation jacket 251 and a delivery valve 254 in delivery conduit 256.

In a first aspect of expansion energy recovery by a modified direct expansion cycle, the liquid hydrogen is pumped to an elevated pressure that in the illustrative example of FIG. 7 is 100 bars. The liquid hydrogen is pumped from point 311 to point 341 of FIG. 7 by cryogenic pump 510 that may be a piston pump. The piston pump may include a reciprocating piston either mechanically driven by a crankshaft coupled to a motor or to shaft 261, or else electrically driven by a reciprocating linear electric motor.

The hydrogen is then warmed along supercritical isobar 340 from point 341 to point 342 (see FIG. 7), in a first heat exchanger 520 and a second heat exchanger 521 in conduit 522 communicating from pump 510 to hydrogen expander 260. The warmer heat transfer stream in close proximity to the hydrogen in conduit 522 in first and second heat exchangers 520, 521 may be air from the system feed air inlet, a fuel cell exhaust gas stream, or a Stirling engine working fluid as described in more detail below. First and second heat exchangers 520 and 521 could be used for further cooling of the feed air exiting from heat exchange condenser 282 to achieve a further reduction in humidity and also in air compression power, or alternatively could be used as sinks for fuel cell stack waste heat. For example, the first heat exchanger may warm the hydrogen to an intermediate temperature between 100 K and 150 K, while the second heat exchanger may warm the hydrogen to approximately ambient temperature. Hydrogen storage energy recovery is then achieved in expander 260 as discussed for FIGS. 8-10, in FIG. 11A with a useful refrigeration effect on feed air through heat exchange coil(s) 270 in heat exchange condenser 282. In FIG. 11B, fuel cell waste heat from the cathode is recovered in heat exchange condenser 282, similar to FIGS. 6B and 9B.

A desirable variant is to include a container or bed 523 of ortho-para hydrogen conversion catalyst between first and second heat exchangers 520 and 521. A suitable catalyst is iron impregnated active alumina or hydrous ferric oxide. Hydrogen stored in the parahydrogen spin isomer (the stable isomeric form for liquid hydrogen) upon contact with the ortho-para conversion catalyst will partly convert endothermically to the orthohydrogen isomer. The orthohydrogen isomer constitutes about 75 mole % fraction of hydrogen gas at equilibrium and ambient temperature. By increasing the quantity and reversibility of heat take-up at low temperature, this reverse ortho-para conversion will enable a further improvement in energy recovery as fuel hydrogen is released from liquid hydrogen storage.

Frost accumulation may occur in the first and/or second heat exchangers 520, 521 particularly due to the very low temperatures of the first heat exchanger, which would make defrosting relatively difficult. Another potential issue arises with the thermodynamic inefficiency of using heat at or near ambient temperature for warming a cryogenic fluid at much lower temperatures.

These frost accumulation and thermodynamic inefficiencies could be overcome if a regenerative thermodynamic engine cycle is used to accept heat at an upper temperature near ambient temperature (e.g., heat from cooling feed air and condensing humidity, or alternatively fuel cell stack waste heat at somewhat higher than ambient temperature), and to reject heat at a lower temperature corresponding to the warming of the cryogenic hydrogen. The regenerative engine cycle then delivers mechanical power to recover a fraction of the hydrogen storage energy previously expended in the fuel supply infrastructure to liquefy hydrogen. Because of the conversion of thermal to mechanical energy, the regenerative engine cycle accepts much more heat at the upper temperature than it rejects at the lower temperature, thus leveraging its desirable cooling effect by the recovery of mechanical power here applied to compressing air into the oxygen PSA.

More specifically, FIGS. 11A and 11B illustrate a second aspect of energy recovery from liquid hydrogen storage. In particular, a Stirling engine 530 is provided for recovering mechanical energy and obtaining an enhanced cooling effect from the release of fuel hydrogen from cryogenic storage. While FIGS. 11A and 11B illustrate the combination of direct expansion and Stirling cycle energy recovery systems, it is to be understood that either of these energy recovery systems may be applied independently without the other. For example, in the case of a Stirling cycle energy recovery system alone, the presence of the expander 260 that performs at least a portion of the direct expansion cycle energy recovery is not required. A regenerative Brayton cycle engine may be provided as an alternative to the Stirling engine 530 as an example of an engine based on a regenerative thermodynamic cycle.

The Stirling engine 530 of FIG. 11A is a two-stage machine having a first regenerator 531 and a second regenerator 532 that has a larger gas volume than first regenerator 531. Each regenerator 531, 532 defines a flow path between first and seconds ends thereof, with solid material (e.g., wire mesh packing) having heat storage capacity disposed along the flow path and in thermal contact with gas in the flow path. The Stirling engine 530 has a working volume including the first and second regenerators 531, 532 and three cyclic displacement chambers, including a first chamber 534, a second chamber 535 and a third chamber 536. The working volume is filled with any suitable working fluid such as hydrogen or alternatively helium. The working fluid and the fuel gas may be substantially identical. Hydrogen is the preferred working fluid when hydrogen is the fuel gas.

The first chamber 534 is in fluid communication with a first end of first regenerator 531 via conduit 580. Conduit 580 includes a heat exchange coil 541 located between the first chamber 534 and the first regenerator 531. The heat exchange coil 541 is proximally disposed to heat exchanger 520 such that heat is exchanged from the warmer Stirling engine working fluid to the cooler hydrogen fuel. The second chamber 535 is in fluid communication with a first end of second regenerator 532 and a second end of first regenerator 531 via conduit 581. Conduit 581 includes a heat exchange coil 542 located between the second chamber 535 and the first and second regenerators 531, 532. The heat exchange coil 542 is proximally disposed to heat exchanger 521 such that heat is exchanged from the warmer Stirling engine working fluid to the cooler hydrogen fuel. The third chamber 536 is in fluid communication with the second end of second regenerator 532 via conduit 582. Conduit 582 includes a heat exchange coil 543 located between the third chamber 536 and the second regenerator 532. Heat exchange coil 543 is disposed within condenser 282 such that heat is exchanged from the cooler Stirling engine working fluid to the warmer feed air. The Stirling engine 530 can run at a relatively high speed (e.g., about 1000 to about 3000 RPM) so that the heat exchanges described above are smoothed out to be effectively continuous.

Alternatively, heat exchange coil 543 could be in heat exchange (not shown) with the fuel cell stack exhaust stream or separator 236 for recovery of fuel cell waste heat. In such an alternative embodiment, the heat exchange coil 543 and a conduit carrying a fuel cell cathode exhaust stream and/or a fuel cell anode exhaust stream could both be disposed within a heat exchanger such that heat is transferred from the fuel cell exhaust stream to the Stirling engine working fluid.

The mechanism of the Stirling engine 530 causes cyclic volume changes to take place within the first, second and third chambers 534, 535, 536, respectively, at the working frequency of the Stirling engine 530. The relative phases of these cyclic volume changes are predetermined to achieve cyclic variations of total working space volume and the pressure within the working space. These cyclic variations are coordinated with cyclic reversals of working fluid flow in the first and second regenerators 531, 532. The flow direction of the working fluid through the Stirling working volume is typically directed towards the higher temperature end of each regenerator 531, 532 when the pressure in that regenerator is higher than the mean working pressure within the displacement chambers 534, 535, and 536 of the Stirling engine 530. The flow direction of the working fluid through the Stirling working volume is typically directed towards the lower temperature end of each regenerator 531, 532 when the pressure in that regenerator is lower than the mean working pressure within the displacement chambers 534, 535, and 536 of the Stirling engine 530. The phase of cyclic volume changes in the first and second chambers 534, 535 should lag the phase of volume changes in the third chamber 536, typically by about 90°, for generating heat for warming the hydrogen fuel in heat exchangers 520 and 521 while simultaneously removing heat from the feed air via heat exchange coil 543.

In the particular illustrative Stirling engine configuration 530, coaxial cylinders 550 and 551 define the first and second chambers 534 and 535, respectively. A stepped piston 555 is received within cylinders 550,551. The cylinders 550,551 engage the stepped piston 555 such that the stepped piston 555 can undergo axial movement relative to the cylinders 550,551. An additional cylinder 556 defines the third chamber 536. An additional piston 557 is received within the cylinder 556. The cylinder 556 engages the piston 557 such the piston 557 can undergo axial movement relative to the cylinder 556. Pistons 555 and 557 are respectively coupled by connecting rods 560 and 561 to crank pin 562 on crank 563, which revolves on crankshaft 564 within crankcase 565. The direction of rotation of crankshaft 564 is clockwise as shown by arrow 566. Coaxial cylinders 550 and 551 are mounted with a right angled offset to cylinder 556 in order to establish the desired phase relation of cyclic displacements in the first, second and third chambers 534, 535, 536. Dashed line 570 represents a mechanical coupling from crankshaft 564 to assist driving compressor 101, or alternatively a vacuum pump 103 in a VPSA configuration. Of course, alternative Stirling engine designs could be employed such as a single cylinder, piston-plus-displacer design.

In the energy recovery operating mode as described above, the Stirling engine 530 delivers mechanical power while rejecting heat to warm the cryogenic fuel. The Stirling engine 530 may be operated in reverse either by reversing the rotational direction (opposite the normal direction shown by arrow 566) of the crankshaft 564 or by reversing the phase so that cyclic volume displacements in the first and second chambers 534, 535 have a leading phase with respect to cyclic volume changes in the third chamber 536. Thus operating in reverse, the Stirling engine 530 consumes power to operate as a cryogenic refrigerator. When the fuel cell power plant is shut down for extended time-periods, evaporation of stored liquid hydrogen becomes a major problem. Reverse operation of the Stirling engine 530 may then be performed at intervals to condense the hydrogen vapor boil-off or sub-cool the stored liquid hydrogen to reduce the vapor pressure and prevent evaporation. Using an external power source to operate the Stirling engine 530 in its reverse refrigeration mode may be initiated automatically when the pressure within the liquid hydrogen storage tank exceeds a specified pressure setting, above which evaporation would take place.

While Stirling engine 530 is depicted as having a crankshaft 564 for mechanically coupling its pistons to each other and to its load (e.g. a vacuum pump or a compressor) by a shaft 570, an alternative approach provides that a Stirling engine piston be directly coupled to a reciprocating cylinder of a compressor 101 or a vacuum pump 103. The crankshaft may then be used to synchronize piston timing, without delivering power to the external load. In free piston embodiments of Stirling engines, the crankshaft coupling may be eliminated.

FIG. 11B illustrates a three stage Stirling engine 530 in which the stepped piston 555 and its associated coaxial cylinders 550, 551 are provided with an additional step defining an intermediate chamber 535' cooperating through heat exchange coil 542' to an intermediate regenerator 531' disposed in the flow path between regenerators 531 and 532. Heat exchange coil 542' is coupled to heat exchanger 521' in which the fuel hydrogen is warmed at a temperature level intermediate between the temperature level in heat exchangers 521 and 270. A refueling connector 572 is fluidly coupled to hydrogen storage vessel 250 for re-supplying the hydrogen storage vessel 250. A fuel inlet 570 is fluidly coupled to the hydrogen storage vessel for introducing fuel into fuel delivery conduit 571.

FIG. 12

Figure 12:
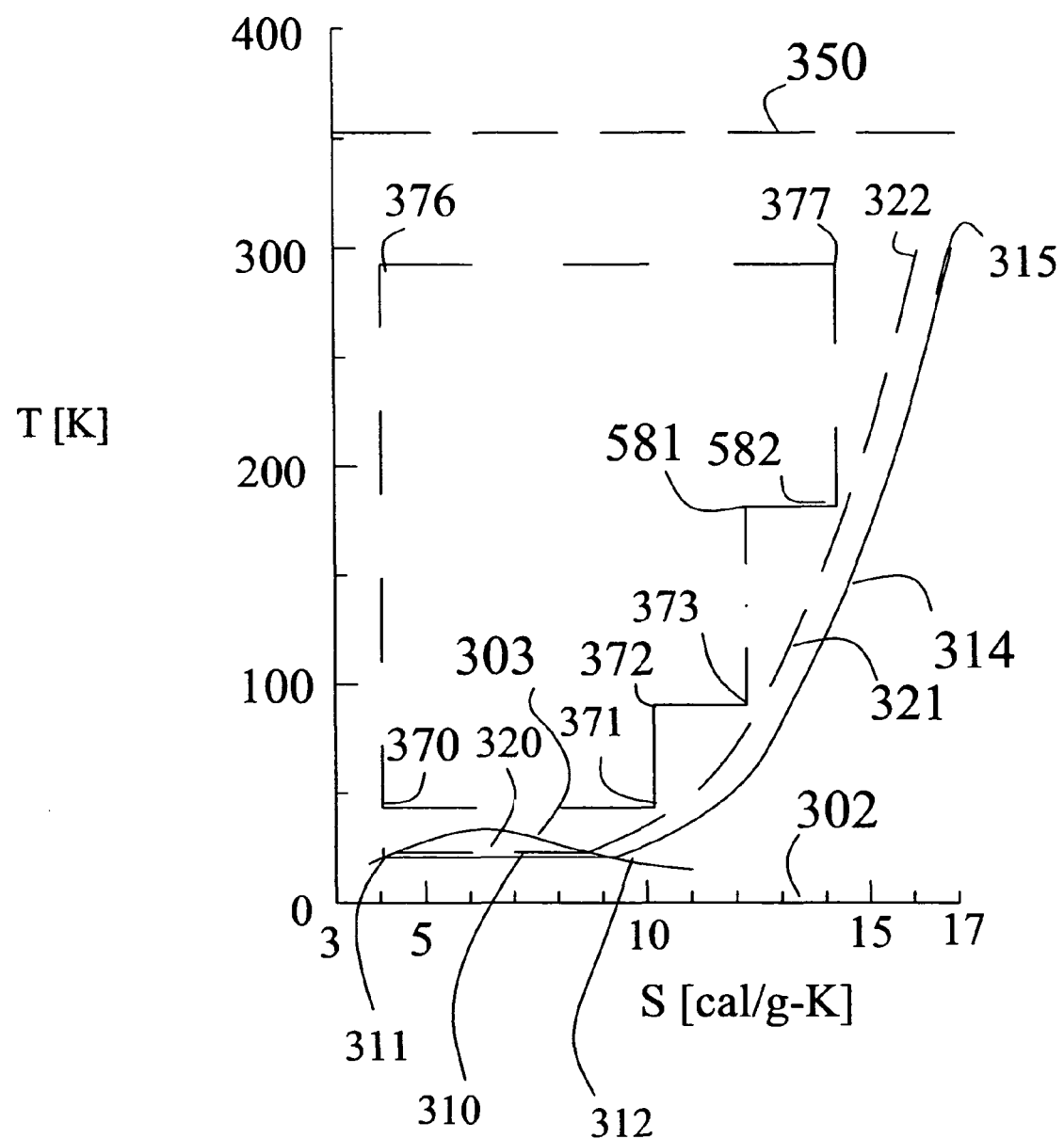
FIG. 12 is a T-S diagram for hydrogen, showing a three stage Stirling cycle energy recovery option.

FIG. 12 shows a temperature-entropy diagram for hydrogen, with a three stage Stirling cycle for energy recovery from hydrogen fuel release from liquid hydrogen storage, but with no direct expansion cycle energy recovery. A three stage Stirling engine may be provided by including a third regenerator and an extra chamber relative to the Stirling engine 530 as illustrated in FIG. 11B. For example, the stepped piston 555 and its associated coaxial cylinders 550, 551 could define an additional step. Corresponding to the extra chamber, the three stage Stirling cycle would reject heat to a second intermediate temperature level defined by points 581 and 582.

FIG. 13

Figure 13:
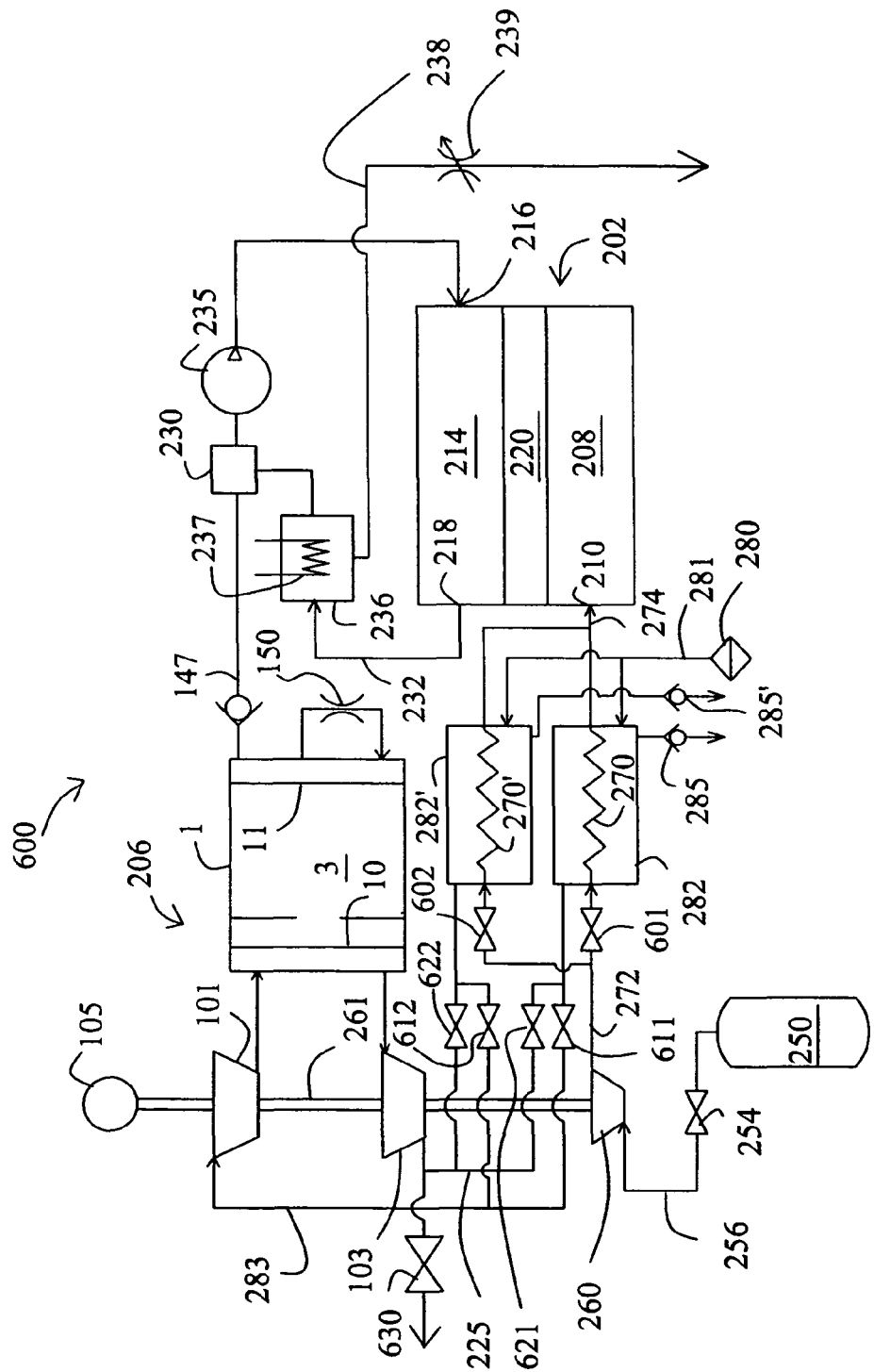
FIG. 13 shows a fuel cell power plant with energy recovery from hydrogen storage, and with provision for defrosting the heat exchange coil in the condenser of the feed air chilling system so as to prevent ice build-up.

FIG. 13 shows a fuel cell power plant 600 that includes a system for defrosting the heat exchange coil 270 in the condenser 282 so as to prevent ice build-up. A second heat exchange coil 270' co-operating with a second condenser 282' is provided in parallel with heat exchange coil 270 co-operating with condenser 282. Heat exchange coils 270 and 270' are in parallel between conduits 272 and 274, and respectively have hydrogen shutoff valves 601 and 602 so that hydrogen flow through one heat exchange coil may be stopped while that coil is being defrosted. Feed air shutoff valves 611 and 612 are provided to connect condensers 282 and 282', respectively, to conduit 283 and compressor 101. Air exhaust shutoff valves 621 and 622 are provided to connect condensers 282 and 282', respectively, to conduit 225 and thence either to the discharge of vacuum pump 103 or directly to the exhaust port of the PSA module. Condenser drain valves 285 and 285' for condensers 282 and 282', respectively, are shown as non-return valves. An air exhaust vent valve 630 is provided for exhaust discharge from conduit 225 whenever both exhaust shutoff valves 621 and 622 are closed.

When one of coils 270 or 270' is being defrosted, its respective hydrogen shutoff valve 601 or 602 is closed, its respective feed air shutoff valve 611 or 612 is closed, and its respective air exhaust shutoff valve 621 or 622 is opened. During non-defrosting operation, coils 270 or 270' cool incoming feed air and condense out humidity and their respective hydrogen shutoff valve 601 or 602 is open, feed air shutoff valve 611 or 612 is open, and air exhaust shutoff valve 621 or 622 is closed. Since the defrost time interval will be relatively short, a plurality of more than two heat exchange coils and condenser combinations (each with its associated hydrogen shutoff valve, feed shutoff valve, and exhaust shutoff valve) may be provided in parallel so that less than half of the feed cooling capacity is shut down during any defrosting interval.

Figure 14:
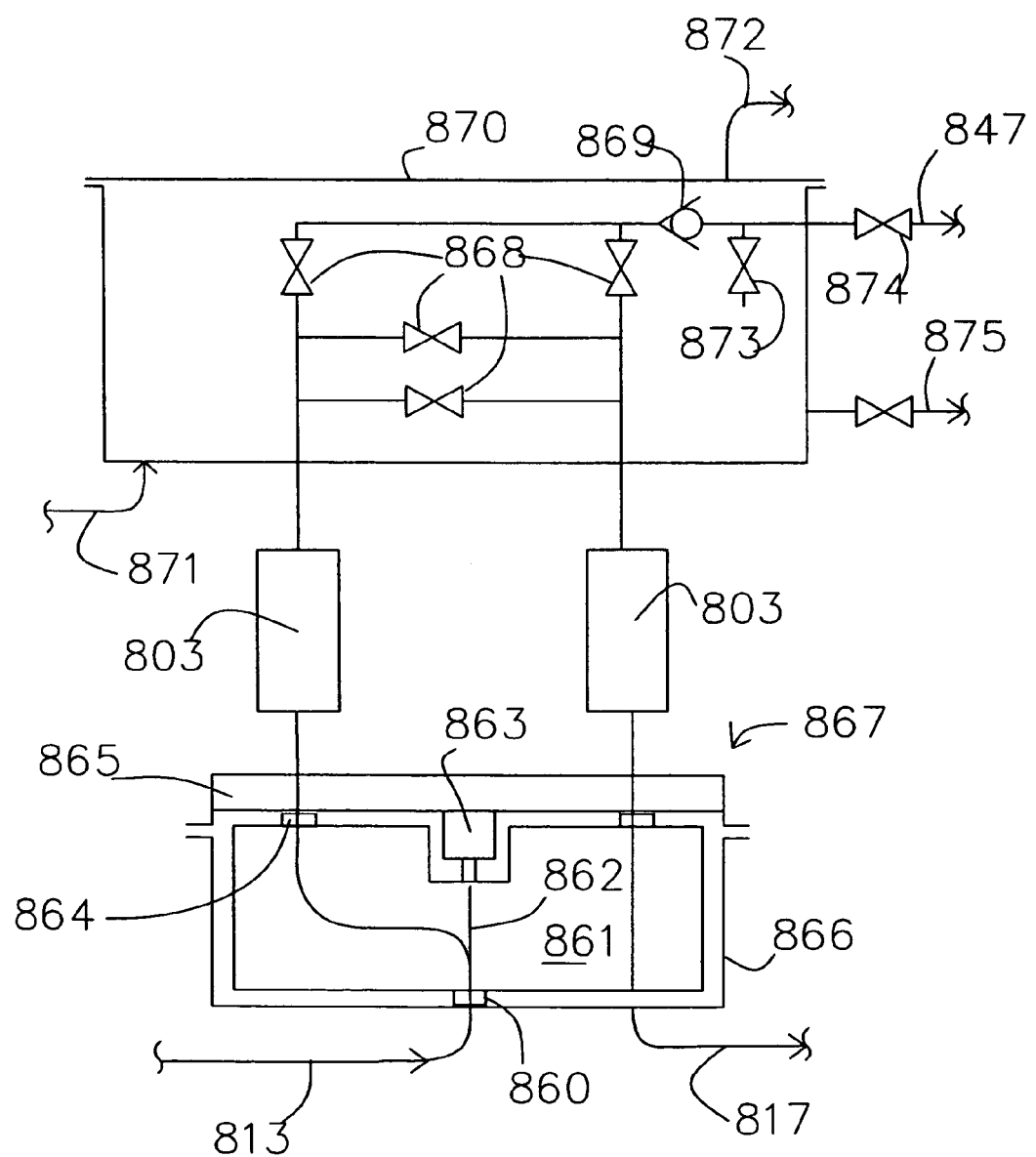
FIGS. 14 and 15 are schematic cross-sections of a rotary valve pressure swing adsorption apparatus.
Figure 15:
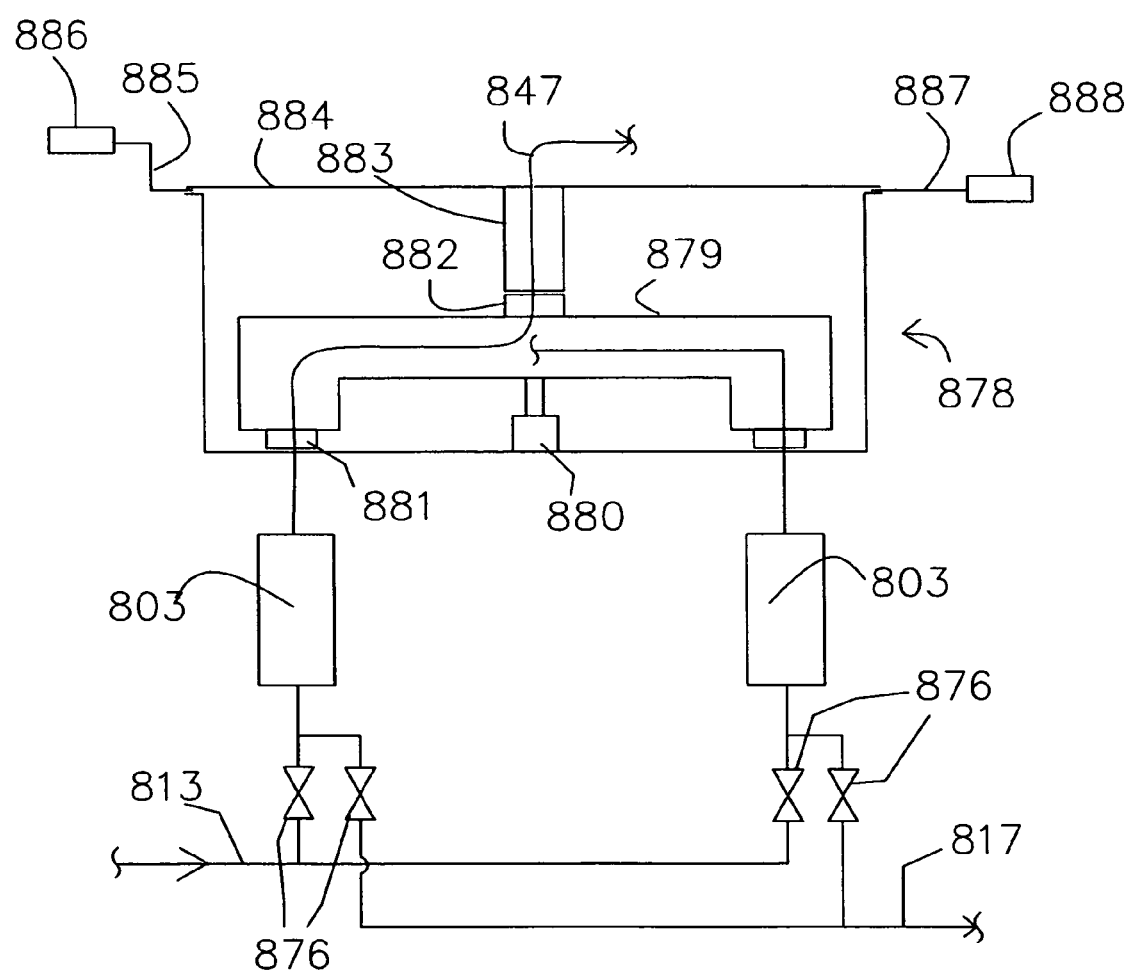

FIGS. 14 and 15

FIGS. 14 and 15 illustrate a representative rotary valve pressure swing adsorption apparatus that could be used in the presently described systems and processes. In particular, FIG. 14 depicts a stationary bed system, where the feed ends of adsorbers 803 use a rotary valve to synchronize flows. The light product end uses some valve switching in order to affect a PSA process. Feed gas is transported via conduit 813 to heavies valve 867, through dynamic seal 860 and rotor body 861, rotating about axis 862 by motor 863. Feed flow is directed to seal 864 and through stator housing 865 to adsorber 803. Exhaust gases are directed from adsorber 803 through stator housing 865, seal 864, and rotor body 861. The fluids are contained by second stator housing 866 in coordination with stator housing 865, and withdrawn via conduit 817.

The light product end of the adsorbers 803 are depicted as conventional conduit with directional valves 868 used to provide synchronized pressure and flow cycling in coordination with the feed end valve 867, and the adsorbers 803, with the product fluid being delivered by product conduit 847. Note that this drawing depicts only the simplest 2-adsorber PSA and that it represents all PSA configurations with a rotary feed valve and conventional valve arrangements for the light product end fluids. The light product end system is completely enclosed in an impermeable container 870, where tight fluid sealing is achieved across the whole boundary. In this option, atmospheric borne contaminants are not able to enter into the process across the valve stem actuators, which are the process containment seals. The static buffer space (the space around the valves bounded by static sealing) is preferably filled with a buffer fluid, introduced by a buffer fluid supply leading to port 871. A positive pressure gradient over the ambient pressure is a preferred option. This buffer fluid is also preferably circulated and refreshed by allowing the fluid to be withdrawn by port 872.

One way valve 869 can be used to minimize reverse flow of any contaminant coming from down stream equipment or processes, as well as the preferred option of using product gas as the buffer fluid by closing valve 874 and allowing the product fluid to enter container 870 via valve 873, and to allow the product to be withdrawn from the container 873 through product conduit 875.

FIG. 15 also depicts a rotary PSA system, wherein the light product end of adsorbers 803 uses a multi-port rotary distributor valve to synchronize pressure and flow cycles. The lights valve 878 contains a rotor 879 being rotated by motor 880, and where dynamic seals 881 communicate with the adsorbers 803 in a cyclic manner. Feed gas is allowed in conduit 813 to a set of directional valves 876, and is then directed to one of the adsorbers 803, where product gas is drawn off through seal 881, through lights rotor 879, and into product conduit 847 via dynamic seal 882 and product port 883. The dynamic seals 881 and 882 are process containment seals, and in the configuration where lights valve housing 884 is not sealed, they are also the primary seal, and have the least amount of resistance to contaminant ingress from the surrounding atmosphere. In one option, the housing 884 can be sealed, in order to create a static buffer space that can be protected as discussed above. Another option is to allow the static buffer chamber to breathe through breather 885 coupled to blanket gas supply 886. Another preferred option is to allow the static buffer chamber to breathe through breather 887, and preferably through guard trap 888. Exhaust gases are withdrawn from adsorber 803 via directional valve 876 and through conduit 817.

A combination of devices shown in FIGS. 14 and 15, such as heavies valve 867, coupled to adsorbers 803 and to lights valve 878 is also considered a rotary PSA. A system consisting of the light product end valves 868 with associated conduits, along with adsorbers 803 and first end valves 878 and associated conduits consist of conventional PSA.

FIG. 16

Figure 16:
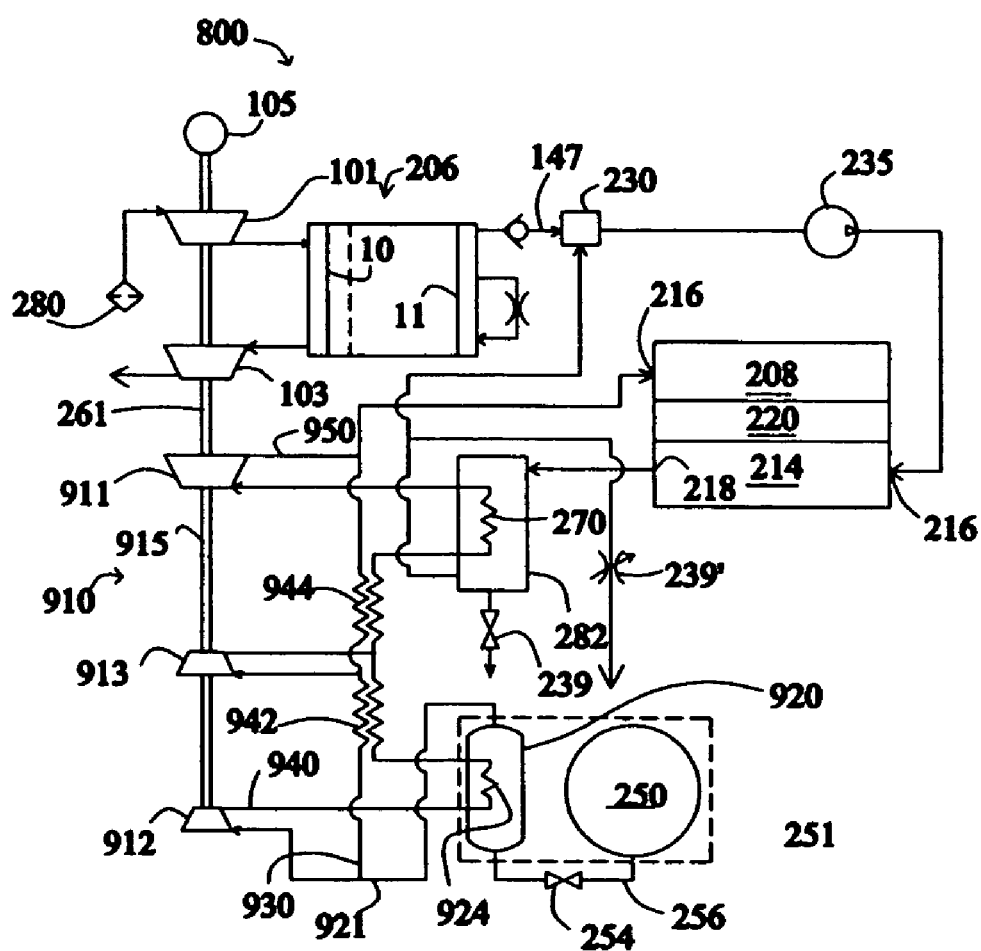
FIG. 16 shows a fuel cell power plant with a Brayton cycle system for energy recovery.

FIG. 16 shows a fuel cell power plant 800 with a regenerative Brayton cycle engine 910 for combined energy recovery from the fuel cell stack waste heat and from a cryogenic hydrogen storage system. The working fluid of the Brayton cycle engine is illustrated as hydrogen. The cryogenic fuel being warmed by the engine passes directly through the engine cycle in this example, although the fuel hydrogen could be warmed indirectly by the engine working fluid as in the above examples based on Stirling engines.

Engine 910 includes an expander 911, a first engine compressor 912 and a second engine compressor 913 which are mechanically coupled by shaft 915. The engine works between an upper pressure and a lower pressure of the Brayton cycle; and in this embodiment expander 911, first engine compressor 912 and second engine compressor 913 all work between substantially the same upper and lower pressures (apart from flow friction pressure drops in conduits and heat exchangers) while operating at different temperatures. Engine 910 is coupled by shaft 261 to a mechanical load, here illustrated as vacuum pump 103 and compressor 101 which may also be powered in part by motor 105. Compressor 101 provides feed air to an oxygen enrichment PSA unit whose exhaust gas is extracted by vacuum pump 103. Motor 105 may serve as a starter motor for engine 910. In the case that the fuel cell is a high temperature type such as a solid oxide fuel cell, the power output of engine 910 may exceed the power demand of compressor 101 and vacuum pump 103, so motor 105 may then function as an electrical generator to deliver excess power recovered by the Brayton cycle engine from fuel cell stack heat and cryogenic hydrogen storage.

Fuel cell power plant 800 has liquid hydrogen stored in dewar 250 which has an insulation jacket 251 and a liquid delivery valve 254 in delivery conduit 256. Delivery conduit 256 delivers liquid hydrogen to vaporizer 920 that is warmed by heat exchange coil 924. Hydrogen gas is delivered from vaporizer 920 by conduit 925 to join Brayton engine lower pressure conduit 930 feeding hydrogen to the inlet of first engine compressor 912. Compressor 912 delivers compressed hydrogen at substantially the upper pressure of the Brayton cycle to Brayton engine upper pressure conduit 940 which delivers the hydrogen to heat exchange coil 924 (thus providing heat of compression from the first engine compressor to the vaporizer 920).

Upper pressure conduit 940 extends through heat exchange coil 924 in the vaporizer, a first recuperator stage 942, a second recuperator stage 944, and heater coil 270 as the hydrogen is warmed from substantially its cryogenic storage temperature to an upper temperature of the Brayton cycle approaching the exit temperature of the fuel cell stack. Hydrogen working fluid having been heated by coil 270 is then expanded by the engine expander 911 to the lower pressure of the Brayton cycle, and is delivered by conduit 950 communicating for fuel delivery to the fuel cell anode inlet port 216 and to the Brayton engine lower pressure conduit 930 returning hydrogen engine working fluid back through recuperator stages 944 and 942 to the inlet of first engine compressor 912. The working fluid mass flow is larger in recuperator stage 944 than in first recuperator stage 942.

The second engine compressor 913 works between the upper and lower pressures in an intermediate temperature range between ambient temperature and the vaporizer temperature, compressing gas from the lower pressure conduit 930 to the upper pressure conduit 940 between recuperators 942 and 944. It delivers heat of compression at an intermediate cryogenic temperature to the hydrogen flowing in the upper pressure conduit toward the warmer end of the engine. Heat of compression from the first engine compressor 912 thus releases the hydrogen fuel by vaporization from its cryogenic storage phase (corresponding to the heat transfer between points 370 and 371 in FIG. 7), while heat of compression from the second first engine compressor 913 assists in warming the fuel (corresponding to the heat transfer between points 372 and 373 in FIG. 7). Heat rejection (as heat of compression) at lower temperatures by the regenerative Brayton engine allows it to recovery more fuel cell waste heat (as heat of expansion), while a wide temperature span between the upper and lower temperatures of the regenerative Brayton cycle will enhance its thermal efficiency. While this embodiment of the invention may be applied to any fuel cell type, highest efficiency is achieved by any regenerative engine cycle when high grade heat can be provided to the engine from a high temperature fuel cell system or from a high temperature component of the fuel cell system. The ability to reject heat from a regenerative engine cycle to the very low temperatures of a liquid hydrogen storage system will greatly enhance attainable efficiency of the engine cycle.

If desired to further improve efficiency of the regenerative Brayton cycle engine, one or more additional recuperator stages could be provided, together with an engine compressor between each adjacent pair of recuperator stages spanning sub-ambient temperatures where heat may usefully be provided from the engine cycle to warm the hydrogen fuel gas. In other variants, fuel cell waste heat may be recovered to heat exchanger coil 270 from the cathode gas stream as depicted, or alternatively from the anode gas stream or from elsewhere in the fuel cell system. It will also be noted that fuel gas from vaporizer 920 could be supplied to the upper pressure conduit rather than the lower pressure conduit, so as to recover some liquefaction energy by direct expansion. Also, the hydrogen fuel gas could be provided to the fuel cell anode at the upper pressure rather than the lower pressure of the regenerative Brayton cycle. It may also be noted that rotary regenerators could be substituted for stationary recuperative heat exchangers of the recuperator stages.

We claim:

1. A power plant system that can use a fuel that is a gas at ambient temperature and pressure, comprising an energy recovery system that comprises:
    at least one cryogenic fuel storage container;
    a first conduit fluidly coupling the fuel storage container and the power plant for delivering fuel from the fuel storage container to the power plant;
    at least one regenerative thermodynamic cycle engine thermally coupled to the first conduit such that heat may be exchanged between the fuel and a working fluid for the regenerative thermodynamic cycle engine;
    an energy recovery operating mode to recover energy from release of fuel from cryogenic storage when the power plant is operating; and
    a reversed operating mode as a cryogenic refrigerator to condense fuel boil-off or subcool stored fuel to prevent evaporation of the fuel when the power plant is shut down.

2. The system according to claim 1, wherein the power plant comprises a fuel cell.

3. The system according to claim 1, wherein the power plant comprises a combustion engine.

4. The system according to claim 1, wherein the cryogenic fuel storage container is selected from a vessel for a bed of a gas sorbent, and a dewar for containing a liquefied gas.

5. The system according to claim 2, wherein the fuel storage container holds compressed hydrogen gas or cryogenic liquid hydrogen.

6. The system according to claim 2, wherein the regenerative thermodynamic cycle engine is coupled to at least one device selected from a compressor, a pump, an adsorber rotor, or a vehicle propulsion device.

7. The system according to claim 1, wherein the regenerative thermodynamic cycle engine comprises a Stirling engine.

8. The system according to claim 7, further comprising at least one expander fluidly coupled to the first conduit between the fuel storage container and a power plant such that the expander can receive fuel from the fuel storage container at a first pressure and provide the fuel to the power plant at a second pressure that is lower than the first pressure.

9. The system according to claim 8, further comprising:
    at least one first heat exchanger fluidly coupled to the first conduit between the expander and the power plant;
    at least one pressure swing adsorption module defining an inlet that is in fluid communication with a second conduit for carrying an air feed stream;
    wherein at least a first portion of the first conduit and at least a portion of the second conduit are disposed within the first heat exchanger such that heat can be transferred from the air feed stream to the fuel.

10. The system according to claim 9, further comprising a third conduit for carrying the working fluid of the Stirling engine, at least a first portion of the third conduit being disposed within the first heat exchanger such that heat can be transferred from the air feed stream to the working fluid of the Stirling engine.

11. The system according to claim 10, further comprising a second heat exchanger housing at least a second portion of the first conduit and at least a second portion of the third conduit such that heat can be transferred from the working fluid of the Stirling engine to the fuel.

12. The system according to claim 7, further comprising:
    a second conduit for carrying an exhaust gas stream from a power plant;
    a third conduit for carrying the working fluid of the Stirling engine; and
    a heat exchanger housing at least a portion of the second conduit and at least a portion of the third conduit such that heat may be transferred from the exhaust gas stream to the working fluid of the Stirling engine.

13. The system according to claim 12, wherein the fuel comprises hydrogen, methane, natural gas, or propane.

14. The system according to claim 1, wherein the working fluid for the regenerative thermodynamic cycle engine is substantially identical to the fuel gas.

15. The system according to claim 1, wherein the working fluid for the regenerative thermodynamic cycle engine and the fuel gas comprise hydrogen.

16. The system according to claim 4, wherein the fuel storage container comprises a pressure vessel that includes a bed of a physical adsorbent.

17. The system according to claim 16, wherein the adsorbent is selected from a carbon material and a zeolite.

18. The system according to claim 4, wherein the fuel comprises hydrogen and the fuel storage container comprises a pressure vessel that includes a bed of hydride forming metal or metallic alloy.

19. The system according to claim 7, wherein the fuel is a liquefied gas, the fuel storage container is a dewar for containing the liquefied gas, and the Stirling engine is configured for operation in reverse as a cryogenic refrigerator for the fuel in the fuel storage container.

20. The system according to claim 7, wherein the Stirling engine has at least one lower temperature cyclic displacement chamber with heat exchange to the cryogenic fuel, a higher temperature cyclic displacement chamber, and regenerators communicating between the chambers, and a mechanism to provide cyclic volume changes in the cyclic displacement chambers at a working frequency of the Stirling engine, further characterized by:
  (a) in the energy recovery operating mode, the Stirling engine has a lagging phase of cyclic volume changes in the lower temperature chamber(s) relative to cyclic volume changes in the higher temperature chamber; and
  (b) in the reversed operating mode as a cryogenic refrigerator, the Stirling engine has a leading phase of cyclic volume changes in the lower temperature chamber(s) relative to cyclic volume changes in the higher temperature chamber.

21. The system according to claim 20, wherein the higher temperature cyclic displacement chamber has heat exchange to ambient air, so as to provide a heat source to the Stirling engine in the energy recovery operating mode while also cooling an air stream, and so as to reject heat in the reversed operating mode as a cryogenic refrigerator.

22. The system according to claim 20, wherein the higher temperature cyclic displacement chamber has heat exchange to an exhaust stream from the power plant, so as to provide a heat source to the Stirling engine in the energy recovery operating mode, with recovery of waste heat from the power plant.

23. The system according to claim 20, wherein the Stirling engine has a crankshaft to establish the phase relation of cyclic displacements in the chambers, and the reversed operating mode is achieved by reversing the direction of rotation of the crankshaft from its direction of rotation in the energy recovery mode.

24. The system according to claim 20, wherein the Stirling engine has a lower temperature cyclic displacement chamber with heat exchange to the cryogenic fuel being released from storage, and at least one additional intermediate temperature cyclic displacement chamber with heat exchange to the cryogenic fuel being warmed between the cryogenic storage temperature and ambient temperature.

* * * * *